United States Patent
Jitsukawa et al.

(10) Patent No.: US 9,954,634 B2
(45) Date of Patent: Apr. 24, 2018

(54) WIRELESS COMMUNICATION METHOD, AND WIRELESS COMMUNICATION APPARATUS

(71) Applicant: FUJITSU LIMITED, Kawasaki-shi, Kanagawa (JP)

(72) Inventors: Daisuke Jitsukawa, Adachi (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 19 days.

(21) Appl. No.: 14/630,000

(22) Filed: Feb. 24, 2015

(65) Prior Publication Data

US 2015/0171984 A1    Jun. 18, 2015

Related U.S. Application Data

(63) Continuation of application No. PCT/JP2012/005369, filed on Aug. 27, 2012.

(51) Int. Cl.
*H04J 11/00* (2006.01)
*H04B 7/024* (2017.01)

(52) U.S. Cl.
CPC .......... *H04J 11/0053* (2013.01); *H04B 7/024* (2013.01)

(58) Field of Classification Search
None
See application file for complete search history.

(56) References Cited

U.S. PATENT DOCUMENTS

| 2004/0105406 A1* | 6/2004 | Kayama ............ H04L 1/1607 370/322 |
| 2012/0026955 A1 | 2/2012 | Benjebbour et al. |
| 2012/0087265 A1* | 4/2012 | Tamaki ............ H01Q 1/246 370/252 |

(Continued)

FOREIGN PATENT DOCUMENTS

| EP | 2413514 A1 | 2/2012 |
| JP | 2012-029181 A | 2/2012 |

(Continued)

OTHER PUBLICATIONS

3GPP TR 36.814 V9.0.0; Technical Report, 3rd Generation Partnership Project; Technical Specification Group Radio Access Network; Evolved Universal Terrestrial Radio Access (E-UTRA); Further advancements for E-UTRA physical layer aspects (Release 9), Mar. 2010.

(Continued)

*Primary Examiner* — Huy D Vu
*Assistant Examiner* — Bao G Nguyen
(74) *Attorney, Agent, or Firm* — Myers Wolin, LLC

(57) ABSTRACT

A wireless communication method including: when transmitting data from at least one of a plurality of transmission apparatuses to a reception apparatus using a radio resource, selecting a first transmission scheme or a second transmission scheme based on a status of transmission from the plurality of transmission apparatuses, the first transmission scheme in which the plurality of transmission apparatuses transmit same data to same reception apparatus using same radio resource, the second transmission scheme in which one transmission apparatus of the plurality of transmission apparatuses transmits the data to the reception apparatus using the radio resource.

14 Claims, 14 Drawing Sheets

(56) References Cited

U.S. PATENT DOCUMENTS

2013/0021925 A1* 1/2013 Yin ................ H04B 7/024
370/252
2013/0250864 A1* 9/2013 Zhang ............ H04W 72/042
370/329

FOREIGN PATENT DOCUMENTS

WO 2008/136219 A1 11/2008
WO 2010/125635 A1 11/2010

OTHER PUBLICATIONS

3GPP TR 36.819 V11.1.0; Technical Report, 3rd Generation Partnership Project; Technical Specification Group Radio Access Network; Coordinated multi-point operation for LTE physical layer aspects (Release 11), Dec. 2011.

3GPP TS 36.211 V10.5.0; Technical Specification, 3rd Generation Partnership Project; Technical Specification Group Radio Access Network; Evolved Universal Terrestrial Radio Access (E-UTRA); Physical Channels and Modulation; (Release 10), Jun. 2012.

International Search Report with Written Opinion of the International Searching Authority issued for corresponding International Application No. PCT/JP2012/005369, dated Oct. 16, 2012, with English translation.

Notification of Reasons for Refusal issued for corresponding Japanese Patent Application No. 2014-532559 dated Apr. 12, 2016 with a partial English translation.

Decision of Refusal issued by the Japan Patent Office for corresponding Japanese Patent Application No. 2014-532559, dated Nov. 29, 2016, with an English translation.

Report of Reconsideration by Examiner issued by the Japan Patent Office for corresponding Japanese Patent Application No. 2014-532559, dated Apr. 18, 2017, with an English translation.

* cited by examiner

WIRELESS COMMUNICATION METHOD, AND WIRELESS COMMUNICATION APPARATUS

CROSS-REFERENCE TO RELATED APPLICATION

This application is a continuation application of International Application PCT/JP2012/005369 filed on Aug. 27, 2012, the entire contents of which are incorporated herein by reference.

FIELD

The present invention relates to a wireless communication method, a wireless communication system, a transmitter station, and a receiver station.

BACKGROUND

In recent years, discussion is made on next-generation wireless communication technology to purpose wireless communication with further high speed, great capacity, and the like in a wireless communication system such as a cellular phone system (cellular system). For example, a communication standard called long-term evolution (LTE) and a communication standard called LTE-Advanced (LTE-A) that is based on the wireless communication technology of LTE are proposed in 3rd Generation Partnership Project (3GPP) which is an organization for standardization.

The newest communication standard completed in 3GPP is Release 10 corresponding to LTE-A. Release 10 is a great functional extension of Release 8 and Release 9 corresponding to LTE. Currently, discussion is being actively made toward the completion of Release 11 that is a further extension of Release 10. Hereinafter, "LTE" is assumed to include other wireless communication systems that are extensions of LTE in addition to LTE and LTE-A unless otherwise specified.

A technology called coordinated multiple point (CoMP) is particularly taken into consideration in Release 11 of 3GPP. CoMP can refer to a technology for which transmission and reception regarding a wireless terminal (user equipment, UE) between a plurality of transmission points (TP) are coordinated. TPs here correspond to transmitter stations that are geographically separated and are a concept that substantially corresponds to a base station or a cell. Thus, a TP may be appropriately substituted with a base station or a cell hereinafter.

Several transmission schemes (categories) are available in CoMP. Joint transmission (JT), dynamic point selection/blanking (DPS/DPB or simply DPS), coordinated scheduling/beamforming (CS/CB), and the like are known as a transmission scheme of down CoMP. "Down" indicates a direction from a TP toward a UE (a so-called downlink), and conversely, "up" indicates a direction from a UE toward a TP (a so-called uplink).

Description of the CoMP transmission scheme will be made based on FIG. 1. FIG. 1A is a diagram illustrating the concept of JT which is one type of CoMP. JT is a transmission scheme in which a plurality of TPs simultaneously transmits (jointly transmits) the same data destined to a certain UE to increase a reception quality and a throughput of the UE. FIG. 1B is a diagram illustrating the concept of DPS which is one type of CoMP. DPS is a transmission scheme in which the same data destined to a UE is simultaneously present in a plurality of TPs, but a single TP transmits data to a UE while other TPs do not perform transmission (blanking). Accordingly, an instantaneous dynamic cell (TP) selection that follows fading variations is possible rather than a normal cell (TP) selection of LTE based on the state of a channel that is temporally averaged. FIG. 1C is a diagram illustrating the concept of CS/CB which is one type of CoMP. CS/CB is a transmission scheme in which a single TP performs transmission to a certain UE in a certain sub-frame, and coordinated scheduling and beamforming are performed between TPs to reduce interference given to other UEs governed by other TPs. In the present document, JT which is joint transmission performed by a plurality of TPs and DPS and CS/CB in which a plurality of TPs performs single transmission in coordination with each other may be collectively referred to as coordinated single transmission. In addition, JT of CoMP is called a single-point transmission (ST) when a single TP performs data transmission without coordinating with other TPs.

In ST in which a TP performs transmission to a UE governed by the TP, only a wireless signal transmitted from the TP is a desired wave for the UE. In other words, wireless signals of all of the TPs other than the TP that performs ST are interference waves to the UE in ST. Conversely, wireless signals from all of the TPs that are in a coordinating relationship therebetween in JT are desired waves for a UE. Thus, interference in the UE is reduced when compared with that in ST. In DPS and CS/CB, a wireless signal from one TP among the TPs that are in a coordinating relationship therebetween is a desired wave for a UE, but wireless signals (that become interference waves) are not transmitted from other TPs. Thus, interference in the UE may be reduced when compared with that in ST.

Therefore, any of the transmission schemes of CoMP reduces interference when compared with ST. Accordingly, using any CoMP transmission scheme obtains common effects such as an increase in reception quality and being capable of increasing transmission efficiency. Hereinafter, DPS will be dealt with, and CS/CB will not be dealt with unless otherwise specified because DPS and CS/CB have various similar points. However, it may be noted that CS/CB can also be dealt with in the same manner at places where DPS is dealt with hereinafter.

CITATION LIST

Non Patent Literature

NPL 1: 3GPP TR36.814 V9.0.0(2010-03)
NPL 2: 3GPP TR36.819 V11.1.0(2011-12)
NPL 3: 3GPP TS36.211 V10.5.0(2012-06)

SUMMARY

According to an aspect of the invention, a wireless communication method includes when transmitting data from at least one of a plurality of transmission apparatuses to a reception apparatus using a radio resource, selecting a first transmission scheme or a second transmission scheme based on a status of transmission from the plurality of transmission apparatuses, the first transmission scheme in which the plurality of transmission apparatuses transmit same data to same reception apparatus using same radio resource, the second transmission scheme in which one transmission apparatus of the plurality of transmission apparatuses transmits the data to the reception apparatus using the radio resource.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
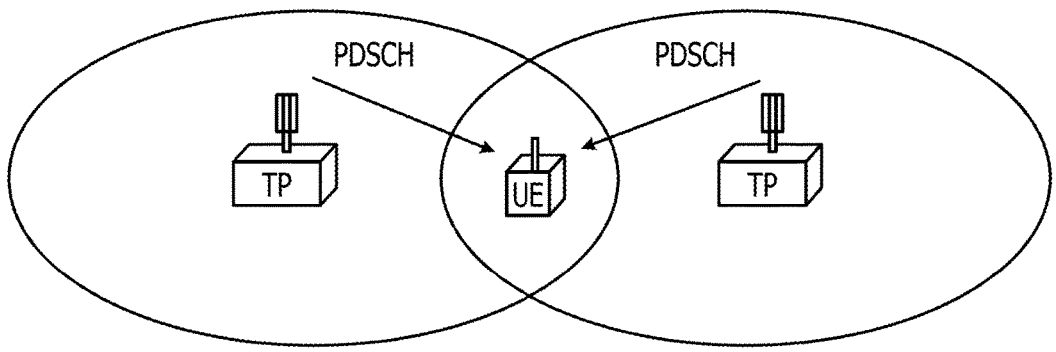
FIGS. 1A to 1C are diagrams illustrating the concept of each CoMP transmission scheme.
Figure 1B:
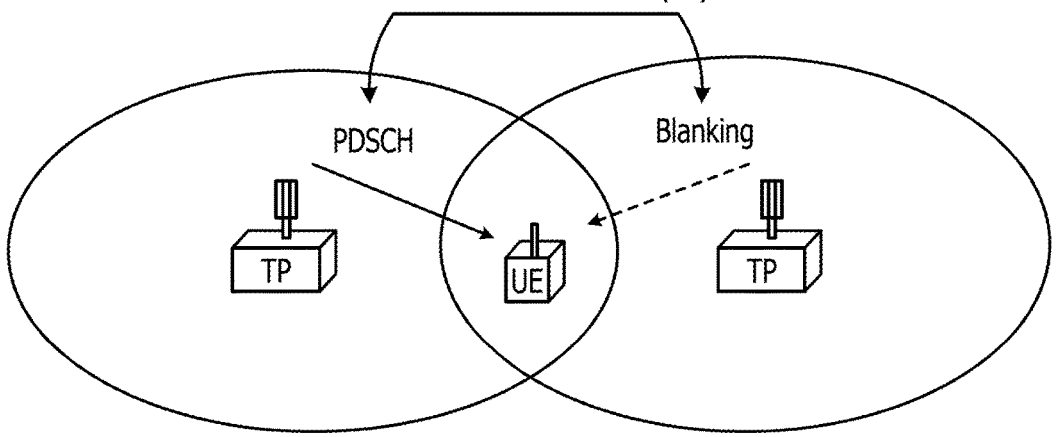
Figure 1C:
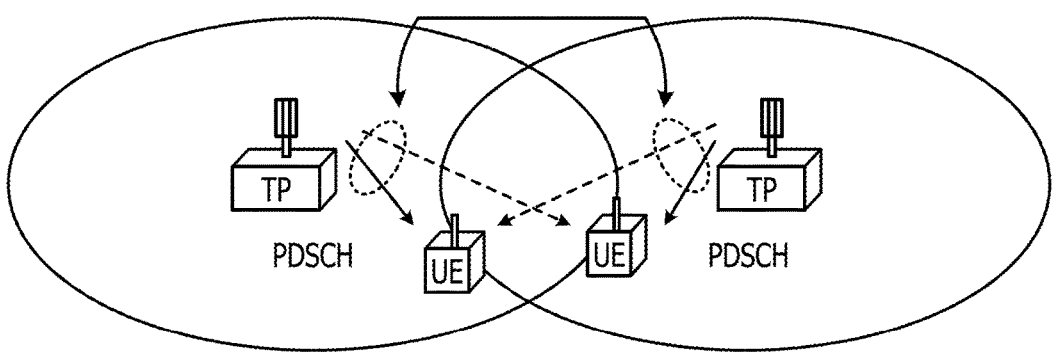

JT and DPS are different transmission schemes of CoMP, but the effect thereof has a commonality as described above. Thus, it is thought that embodying any of JT and DPS does not make a great difference. For this reason, it is thought that sufficiency is achieved if JT or DPS is targeted and embodied independently of situations when CoMP transmission is embodied in a wireless communication system. However, the inventor comes to find that the effect of embodying CoMP transmission is limited in such a wireless communication system, as will be described below, as a result of numerous reviews of this point in detail.

An object of the technology disclosed is to provide a wireless communication method, a wireless communication system, a transmitter station, and a receiver station in which the effect of embodying coordinated transmission (CoMP transmission) can be sufficiently exhibited.

Hereinafter, embodiments of a wireless communication method, a wireless communication system, a transmitter station, and a receiver station disclosed will be described by using drawings. Although the embodiments are individually described for convenience purposes, it is needless to say that usability can further be increased by obtaining the effect of combinations through combining each embodiment.

[Identification of Problem]

Here, identification of a problem in the related art will be described as a preparation before each embodiment is described. It may be noted that the problem is newly found as a result of a detailed review of the related art by the inventor and is not known in the related art.

First, the effects of JT and DPS which are two transmission schemes of CoMP described above are comparatively reviewed.

In JT, a plurality of TPs coordinating (called coordinated TPs) transmits a data signal to a UE that is a target of application of CoMP (called a CoMP target UE) based on the same information as described above. For this reason, interference from coordinated TPs completely disappears in a CoMP target UE according to JT. Furthermore, a desired signal component is increased according to JT because a transmission signal from coordinated TPs is a desired signal. Accordingly, embodying JT is considered to be advantageous to an increase in reception quality and communication efficiency (throughput) of a CoMP target UE.

Next, influence of embodying JT based on a certain wireless resource on a UE that is in exclusion from a target of application of CoMP (called a CoMP target exclusion UE) and uses the wireless resource is considered. Signals transmitted from coordinated TPs are all interference signals to a CoMP target exclusion UE. For this reason, the extent of interference in a CoMP target exclusion UE is considered to be substantially the same as that in a normal case of ST where a plurality of TPs respectively transmits a data signal to different UEs.

Conversely, in DPS, one TP that is dynamically selected from coordinated TPs based on of the instantaneous state of a wireless channel transmits a data signal to a CoMP target UE, and remaining TPs do not perform transmission (blanking) as described above. For this reason, according to DPS, interference from coordinated TPs completely disappears in a CoMP target UE like in JT. Accordingly, embodying DPS is considered to be advantageous to an increase in reception quality and communication efficiency (throughput) of a CoMP target UE.

Meanwhile, unlike in the case of JT, a desired signal component is not increased in DPS when compared with that in ST since only one TP among coordinated TPs transmits a signal. For this reason, the effect of DPS on an increase in reception quality and communication efficiency in a CoMP target UE is considered to be small when compared with the effect of JT.

Next, influence of embodying DPS based on a certain wireless resource on a CoMP target exclusion UE that uses the wireless resource is considered. According to DPS, only a signal transmitted from one TP among coordinated TPs is an interference signal that a CoMP target exclusion UE receives from coordinated TPs. For this reason, the extent (magnitude) of interference in a CoMP target exclusion UE when DPS is embodied is considered to be small compared with the case of JT.

The extent of interference in a CoMP target exclusion UE when DPS is embodied is considered to be the same or small compared with the case of ST. This is because only one TP among coordinated TPs transmits a signal in DPS while it may not be said that only one TP among coordinated TPs transmits a signal in ST (a plurality of TPs respectively performs ST on different UEs).

The effects of JT and DPS are considered to have a difference as comparatively reviewed above. Frankly speaking, JT and DPS has a common advantage of an increase in reception quality and communication efficiency in a CoMP target UE, but the extent of the increase is greater in JT than in DPS. Regarding this point, JT is superior to DPS. Meanwhile, JT and DPS give interference to a CoMP target exclusion UE, but the extent of interference is smaller in DPS than in JT. Regarding this point, DPS is superior to JT.

For this reason, JT and DPS have advantages and disadvantages, and neither JT nor DPS is superior to the other. In addition, which one of JT and DPS is preferable to be embodied depends on various situations related to transmission. For example, the effect of DPS not performing transmission (blanking) on reducing interference is changed by various factors such as the number of sectors per TP, the number of antennas, the distance between TPs, transmission power, and the like. For this reason, the validity of applying the same CoMP transmission scheme to each TP or each UE is considered to be low.

Based on the above considerations, the inventor finds a problem of being not capable of obtaining a sufficient effect from embodying CoMP transmission in a wireless communication system in which JT or DPS is targeted and embodied independently of the transmission status when embodying CoMP transmission. As described above, this problem is newly found as a result of a detailed review of the related art by the inventor and is not known in the related art. Each embodiment of the present application described below is created by the inventor to solve the problem.

Simple description of an example of a wireless communication system that has the above-described problem will be made based on FIG. 2 to FIG. 3 before describing each embodiment of the present application. This description is made for a comparison between the embodiments of the present application described below. Thus, only a process flow will be simply described here. Description of each embodiment of the present application below may be appropriately referred to for the detailed contents of processes or terms used here.

Figure 2:
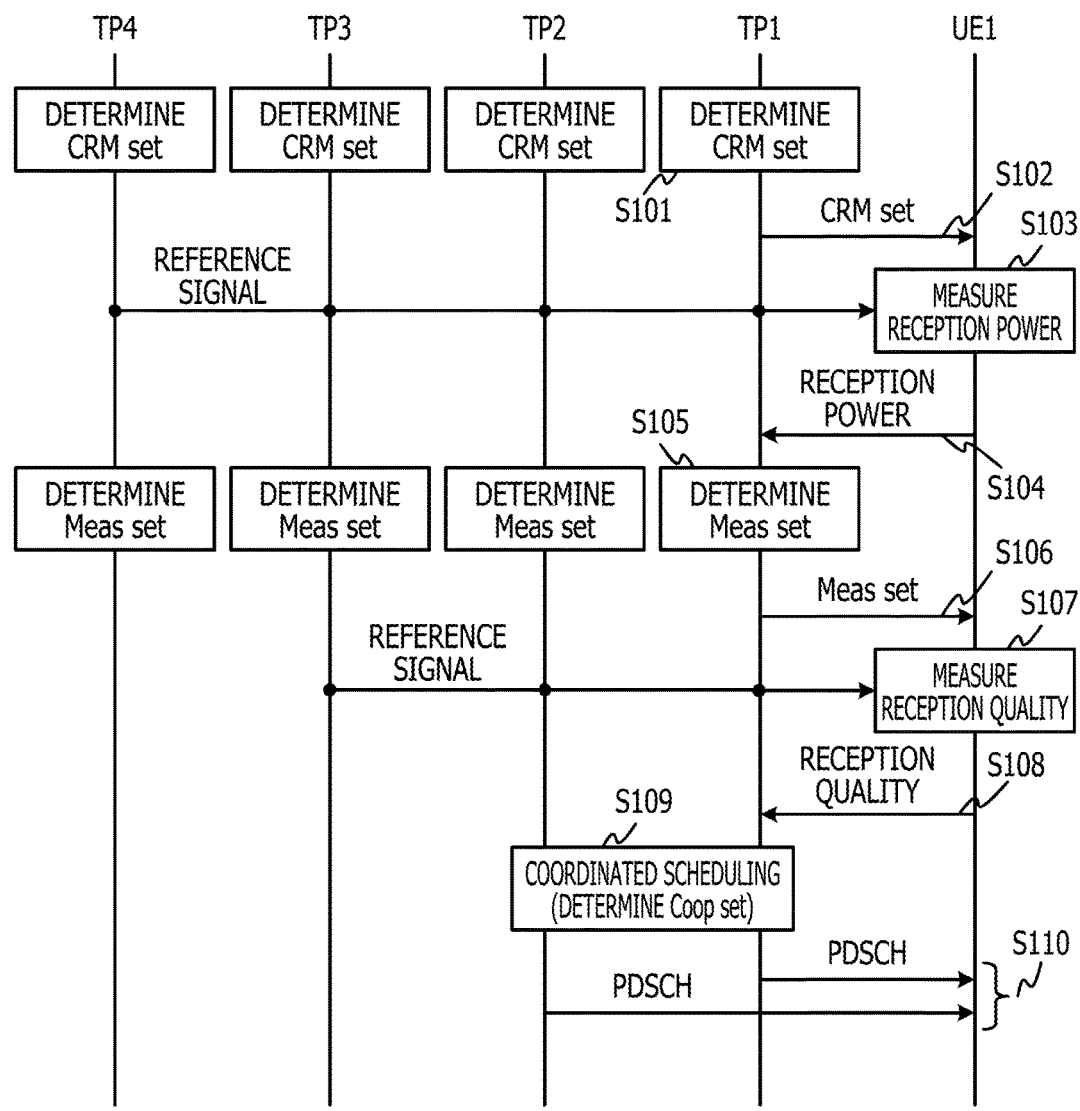
FIG. 2 is a diagram illustrating an example of a sequence of processes in a case of performing JT.

FIG. 2 is a diagram illustrating a sequence of processes in a wireless communication system in which JT is targeted and embodied independently of the transmission status when embodying CoMP transmission. A TP1 to a TP4 and a UE1 that is connected to the TP1 are illustrated in FIG. 2.

In FIG. 2, each TP determines a coordinated resource management set (CRM set) in S101, and each TP transmits the CRM set to a UE governed thereby in S102. The CRM set here corresponds to a set of target TPs that allow UEs governed by the target TPs to measure reception power. The CRM set of the UE1 is configured from the TP1 to the TP4 in FIG. 2 as an example. The UE measures reception power from each TP that is represented in the CRM set in S103, and the UE reports the reception power to the connected TP thereof in S104. In S105, each TP determines a CoMP measurement set (written as a "Meas set" in FIG. 2) based on the report in S104, and each TP transmits the CoMP measurement set to a UE governed thereby in S106. The CoMP measurement set here corresponds to a set of target TPs that allow UEs governed by the target TPs to measure a reception quality. The CoMP measurement set of the UE1 is configured from the TP1 to the TP3 in FIG. 2 as an example. The UE measures a reception quality from each TP that is represented in the CoMP measurement set in S107, and the UE reports the reception quality to the connected TP thereof in S108. Each TP performs coordinated scheduling in S109. The CoMP transmission scheme embodied in the example in FIG. 2 is JT at all times. Thus, a CoMP cooperating set (written as a "Coop set" in FIG. 2) that corresponds to a set of TPs coordinating in CoMP transmission or such things is determined in S109. The cooperating set is configured through coordinated scheduling by the TP1 and the TP2 in FIG. 2 as an example. Last, each TP transmits data to a UE using JT in S110. In FIG. 2, JT is performed by each of the TP1 and the TP2 transmitting data to the UE1 through a PDSCH that is a physical downlink shared channel.

Figure 3:
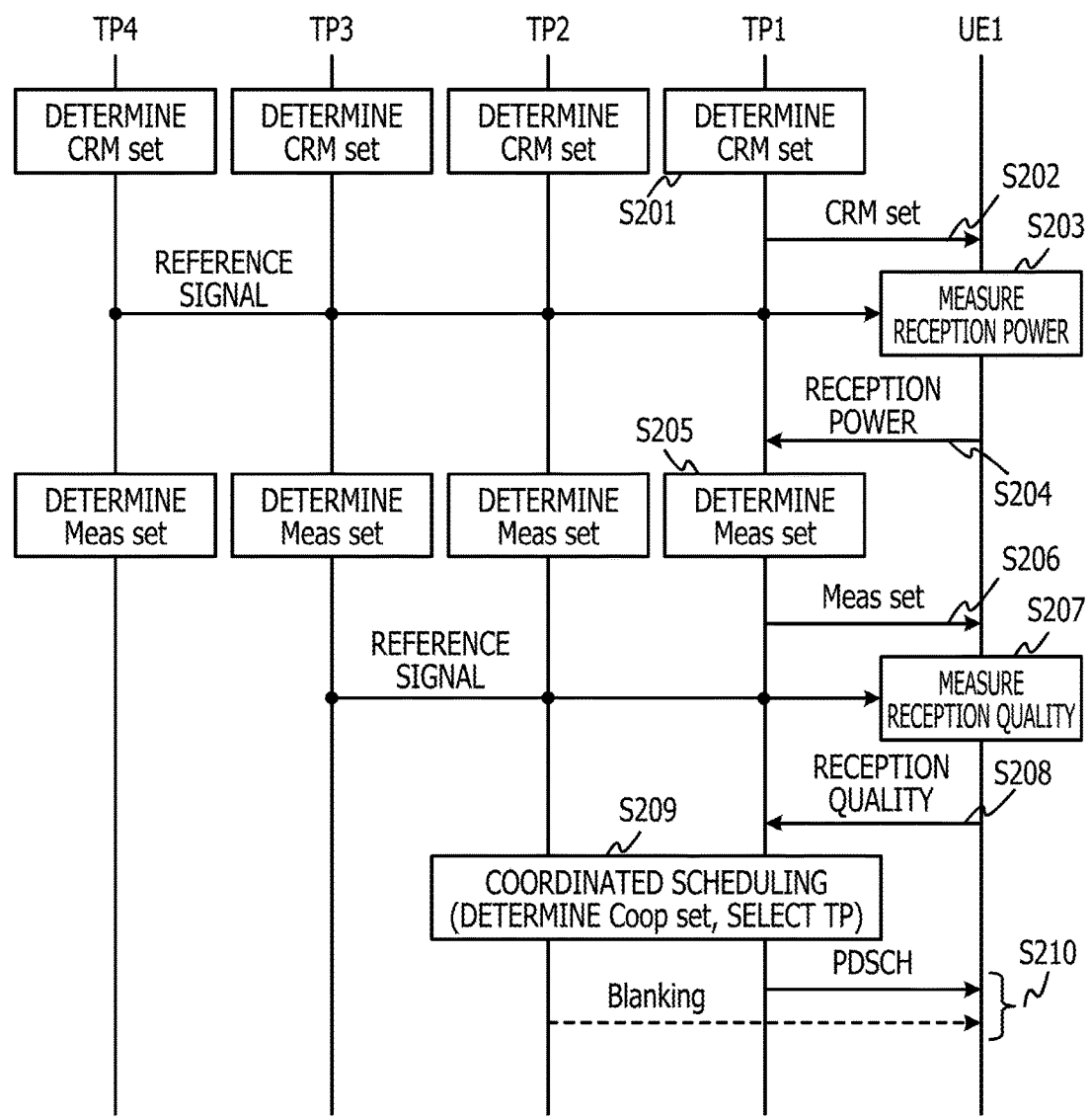
FIG. 3 is a diagram illustrating an example of a sequence of processes in a case of performing DPS.

FIG. 3 is a diagram illustrating a sequence of processes in a wireless communication system in which DPS is targeted and embodied independently of the transmission status when embodying CoMP transmission.

S201 to S208 in FIG. 3 respectively correspond to S201 to S208 in FIG. 2. Thus, description thereof will be omitted. Each TP performs coordinated scheduling in S209 in FIG. 3. The CoMP transmission scheme embodied in the example in FIG. 3 is DPS at all times. Thus, a TP that becomes a transmission point is also determined in addition to the CoMP cooperating set in S209.

The cooperating set is configured through coordinated scheduling by the TP1 and the TP2, and the transmission point of DPS is set to the TP1 in FIG. 3 as an example. Last, each TP transmits data to a UE using DPS in S210. In FIG. 3, DPS is performed by the TP1 which is the transmission point transmitting data to the UE1 through the PDSCH and the TP2 not performing transmission (blanking).

First Embodiment

A first embodiment of the present application is an embodiment in which a wireless communication system selectively embodies a CoMP transmission scheme (JT and DPS) depending on the transmission status. In other words, in the first embodiment of the present application, a first transmitter station that is included in a plurality of transmitter stations which performs transmission based on the same wireless resource selects from a first transmission scheme in which the plurality of transmitter stations transmits the same data to the same receiver station using the wireless resource and a second transmission scheme in which one transmitter station among the plurality of transmitter stations uses the wireless resource based on the transmission status of the plurality of transmitter stations.

Figure 4:
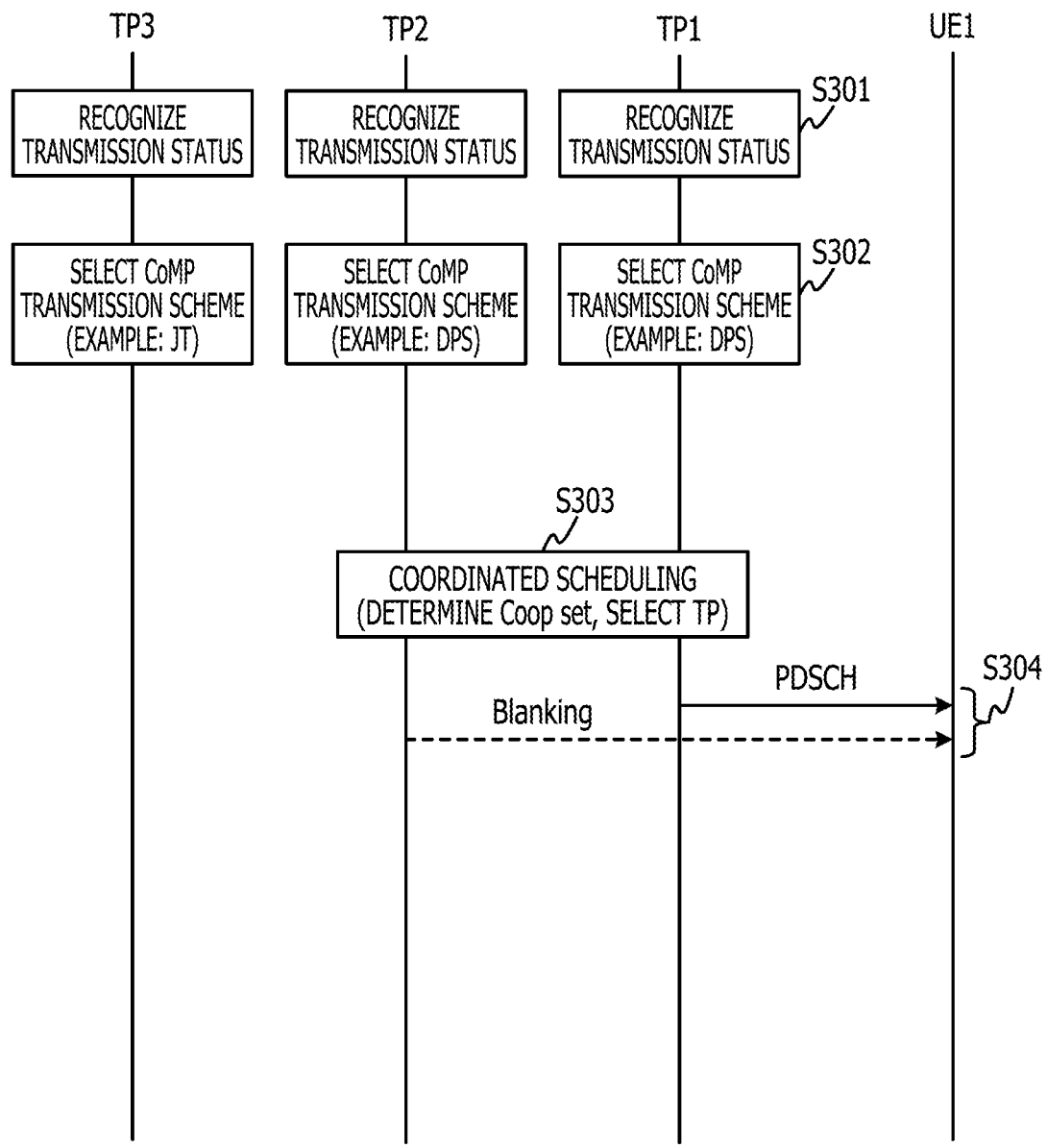
FIG. 4 is a diagram illustrating an example of a sequence of processes of a first embodiment.

Hereinafter, description of a wireless communication system of the first embodiment will be specifically made based on drawings. FIG. 4 is an example of a sequence of processes when the wireless communication system of the first embodiment performs coordinated transmission (CoMP transmission).

Two TPs of the TP1 and the TP2 and the UE are illustrated in FIG. 4. The UE here is set to be connected to the TP1. The connection here means that the UE is governed (managed) by a TP. In normal one-on-one transmission (ST) that is not CoMP, transmission and reception of a data signal or a control signal are performed between the UE and the connected TP thereof. The connection relationship between the UE and the TP is managed on a network side.

In FIG. 4, each TP (the TP1 and the TP2) recognizes the transmission status in S301. The transmission here may be transmission performed by each TP. In this case, the transmission status may include all the situations related to the transmission performed by each TP. The transmission status can be the extent (magnitude) of interference of a transmission signal from each TP given to other TPs (for example, the TP2 or other TPs for the TP1) as an example. As another example, the transmission status can be the amount or the priority (QoS and the like) of data transmitted to the UE.

Alternatively, the transmission status can be various measurement results (reception power, a reception quality, and the like measured in the UE) based on a signal that the TP transmits (a downlink signal). In addition, the transmission status may use these individually or may combine these appropriately.

In S302 in FIG. 4, each TP selects (determines) a CoMP transmission scheme based on the transmission status that is recognized in S301. The CoMP transmission scheme here is any one of JT and DPS. Meanwhile, CS/CB can be used instead of DPS as described above. In addition, not only CoMP transmission but also ST can be set to be selected depending on the transmission status.

The selection of the CoMP transmission scheme in S302 may be based on all the criteria related to the transmission status. As an example, in a case where the extent (magnitude) of interference of a transmission signal from each TP given to other TPs is the "transmission status", JT can be selected when the extent of the interference is comparatively small, and DPS can be selected when the extent of the interference is comparatively great. As another example, in a case where the amount or the priority (QoS and the like) of data transmitted to the UE is the "transmission status", JT can be selected when the amount of the data is comparatively great or the priority of the data is comparatively high, and DPS can be selected when the amount of the data is comparatively small or the priority of the data is comparatively low. Alternatively, in a case where the various measurement results (reception power, a reception quality, and the like measured in the UE) based on a signal that each TP transmits (downlink signal) is the "transmission status", JT may be selected when the measurement results are comparatively bad, and DPS may be selected when the measurement results are comparatively good. In addition, these selection criteria of the selection of the CoMP transmission scheme may be used individually or may be combined appropriately.

The TP1 is assumed to select DPS in S302 in FIG. 4 as an example. The TP2 is also assumed to select DPS.

The TP1 and the TP2 perform coordinated scheduling on the UE in S303 in FIG. 4. S303 is performed when data destined to the UE is generated in the TP1.

The TP1 leads the coordinated scheduling performed on the UE. The coordinated scheduling includes several processes. The TP1 determines whether to perform CoMP transmission, which TP to coordinate with when performing CoMP transmission, which wireless resource (frequency and time) to use when performing CoMP transmission, and the like in the coordinated scheduling. In addition, both the TP1 and the TP2 select DPS in S302 in this example. Thus, a transmission point (TP) that actually performs transmission is also determined in the coordinated scheduling. Here, the TP1 is set to the transmission point that actually performs transmission, and the TP2 is set not to perform transmission as an example.

Determination of these may be performed in order or may be performed in a parallel manner or in a batched manner. In addition, the TP1 may receive from or transmit to other TPs (the TP2 or the TP3) appropriate information when determining these.

The TP1 notifies the TP2 which is a coordinated cell of what the TP1 previously determines in the coordinated scheduling. Specifically, the TP1, for example, notifies the TP2 of what the TP1 determines as a coordinated cell, a wireless resource used in coordinated transmission, and the like. In addition, the TP1 shares data between the coordinated TPs by transmitting data destined to the UE to the TP2 when performing JT or DPS.

The TP1 and the TP2 perform coordinated transmission to the UE in S304 in FIG. 4. In S304, the TP1 and the TP2 perform coordinated transmission that each thereof determines in S302 on the UE. Both the TP1 and the TP2 select DPS in S302 in this example. Thus, data transmission is performed to the UE based on the wireless resource and the transmission point determined in S303. The transmission point is determined to be the TP1 in S303 in this example. Thus, the TP1 performs transmission to the UE using the wireless resource, and the TP2 does not perform transmission in the wireless resource. According to the description hereinbefore, processes in CoMP transmission are realized based on the first embodiment.

According to the description of the first embodiment based on FIG. 4, each TP can select a CoMP transmission scheme based on various transmission statuses in S302. Accordingly, a proper CoMP transmission scheme may be used for each of a case where JT is relatively advantageous over DPS and a case where DPS is relatively advantageous over JT. Accordingly, the effect of embodying CoMP may be sufficiently exhibited according to the first embodiment.

FIG. 4 that is previously described is an example of the process of the first embodiment. Although both the TP1 and the TP2 are described to select DPS in S302 as an example, the selection in S302 is apparently not limited to that in the example. For example, it is natural to consider a case where both the TP1 and the TP2 select JT in S302. In this case, both the TP1 and the TP2 perform transmission to the UE using the wireless resource in S304.

In addition, for example, a case where one of the TP1 and the TP2 selects JT, and the other selects DPS in S302 is also considered. As will be described below, several coordinating methods are considered regarding the behavior of each TP when different CoMP transmission schemes are selected between coordinated cells as this case.

Figure 5A:
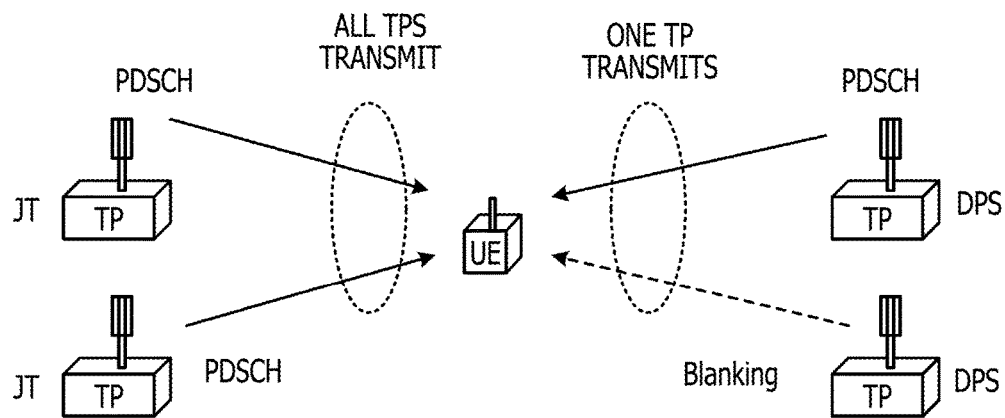
FIGS. 5A and 5B are diagrams illustrating behavior when different transmission schemes of CoMP are selected between coordinated TPs.

FIG. 5A is a diagram illustrating a first coordinating method when different CoMP transmission schemes are selected between coordinated cells. All the TPs that select JT perform transmission in the first coordinating method as illustrated in FIG. 5A. In addition, one TP that is dynamically selected among the TPs that select DPS performs transmission, and the remaining TPs do not perform transmission (blanking). The first coordinating method corresponds to a simple combination of JT and DPS.

Figure 5B:
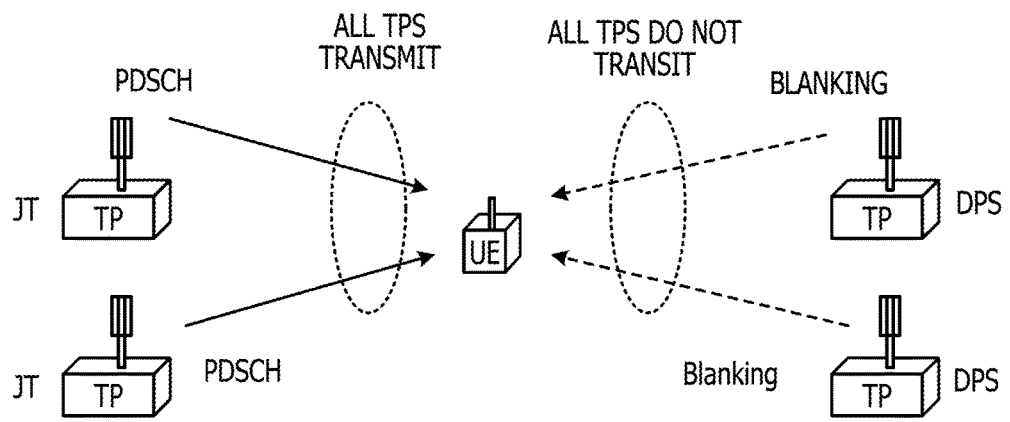

FIG. 5B is a diagram illustrating a second coordinating method when different CoMP transmission schemes are selected between coordinated cells. All the TPs that select JT perform transmission, and all the TPs that select DPS do not perform transmission (blanking) in the second coordinating method as illustrated in FIG. 5B. The second coordinating method is based on a consideration in which the TP that selects DPS does not have to perform transmission since the TP that selects JT performs transmission.

A process of unifying (combining and adjusting) CoMP transmission schemes at a time of coordinated scheduling or the like between TPs coordinating may be additionally performed when different CoMP transmission schemes are selected between coordinated cells. For example, a method of allowing other coordinated TPs to comply with a CoMP transmission scheme that a connected TP selects is considered when different CoMP transmission schemes are selected between coordinated cells. In addition, as another example, a method of unifying a CoMP transmission scheme using majority rule between coordinated cells is considered when different CoMP transmission schemes are selected between coordinated cells. Each TP can perform coordinated transmission based on one of these coordinating methods or any combination thereof when different CoMP transmission schemes are selected between coordinated cells.

According to the wireless communication system of the first embodiment described hereinbefore, JT and DPS can be selectively embodied depending on the transmission status. Accordingly, a proper CoMP transmission scheme may be used for each of a case where JT is relatively advantageous over DPS and a case where DPS is relatively advantageous over JT. Accordingly, the effect of embodying CoMP may be sufficiently exhibited according to the first embodiment.

Second Embodiment

A second embodiment of the present application is an embodiment that deals with interference which occurs based on the transmission of a TP as a specific example of the "transmission status" in the first embodiment. For this reason, a TP receives information related to interference that occurs based on the transmission performed by the TP from other TPs. In other words, in the second embodiment of the present application, a transmitter station receives information related to the transmission status (as a specific example, information related to interference given to other transmitter stations) and selects a CoMP transmission scheme based on the information in the wireless communication system of the first embodiment.

Figure 6:
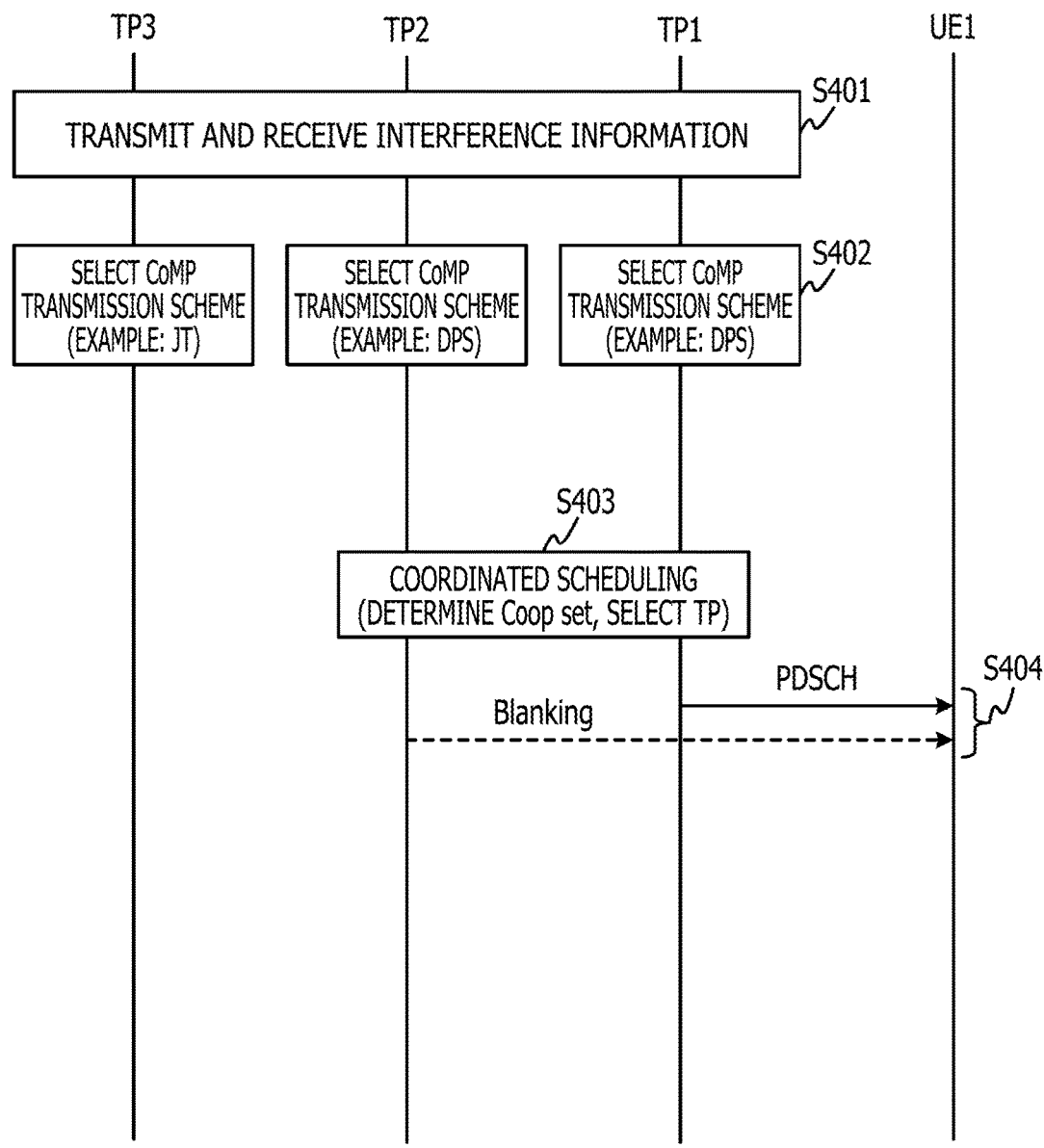
FIG. 6 is a diagram illustrating an example of a sequence of processes of a second embodiment.

Hereinafter, description of a wireless communication system of the second embodiment will be specifically made based on drawings. FIG. 6 is a diagram describing an example of a sequence of processes when the wireless communication system of the second embodiment performs coordinated transmission. Different points between the first embodiment and the second embodiment will be centrally described in the second embodiment because the second embodiment has many common points with the first embodiment.

In FIG. 6, each TP (the TP1 and the TP2) receives interference information from other TPs in S401. Here, the interference information that each TP receives is information related to interference that other TPs receive based on the wireless transmission performed by the TP. The interference information here can be information that indicates the extent (magnitude) of interference which other TPs receive based on the wireless transmission performed by the TP as an example. The interference that other TPs receive may include not only the interference that other TPs receive but also the interference that UEs governed by other TPs (UEs connected to other TPs) receive.

Reception of the interference information may be passively performed or may be actively performed by transmitting information for requesting the interference information to other TPs. In addition, other TPs that transmit the interference information may transmit the interference information when a predetermined event is detected or may transmit periodically. Transmission of the interference information may be performed one-on-one or may be mutually exchanged or transferred between a plurality of TPs.

The interference information can be received from other TPs but is not limited to this. The TP can also receive the interference information from an upper apparatus. In addition, the TP may receive the interference information from UEs governed by other TPs or may receive the interference information from the UE governed by the TP.

In FIG. 6, each TP selects a CoMP transmission scheme in S402. Each TP here is set to select a CoMP transmission scheme based on the interference information received in S401. For example, JT can be selected when the "extent of interference" that the interference information indicates is comparatively small, and DPS can be selected when the extent of interference is comparatively great. The TP1 is assumed to select DPS in S402 as an example. The TP2 is also assumed to select DPS.

The TP1 and the TP2 perform coordinated scheduling on the UE in S403 in FIG. 6. S403 is the same as S303 in FIG. 4. Thus, detailed description thereof will be omitted.

The TP1 and the TP2 perform coordinated transmission to the UE in S404 in FIG. 6. In S404, the TP1 and the TP2 perform coordinated transmission that each thereof determines in S402 on the UE. Both the TP1 and the TP2 select DPS in S402 in this example. Thus, data transmission is performed to the UE based on the wireless resource and the transmission point determined in S403. S404 is the same as S304 in FIG. 4. Thus, detailed description thereof will be omitted. According to the description hereinbefore, processes in CoMP transmission is realized based on the second embodiment.

According to the description of the second embodiment based on FIG. 6, each TP can select a CoMP transmission scheme based on the extent (magnitude) of interference that is based on the transmission of the TP in S402. Although it is difficult for the TP to measure the extent of interference based on the transmission thereof or to allow the UE governed thereby to measure the extent of interference, the TP can receive the extent of the interference from other TPs according to the second embodiment. Accordingly, a proper CoMP transmission scheme may be used for each of a case where JT is relatively advantageous over DPS (when interference is comparatively small) and a case where DPS is relatively advantageous over JT (when interference is comparatively great). Accordingly, the effect of embodying CoMP may be sufficiently exhibited according to the first embodiment.

As described previously, the second embodiment deals with interference that a transmission signal causes as a specific example of the "transmission status" in the first embodiment. However, interference that a transmission signal causes is only an example of the "transmission status". It may be noted that the interference that a transmission signal causes in the present embodiment can be replaced by various other things included in the "transmission status".

Third Embodiment

A third embodiment of the present application corresponds to an example of the second embodiment of the present application and is an embodiment in which the second embodiment is described more specifically and in detail in accordance with a real LTE system.

Figure 7:
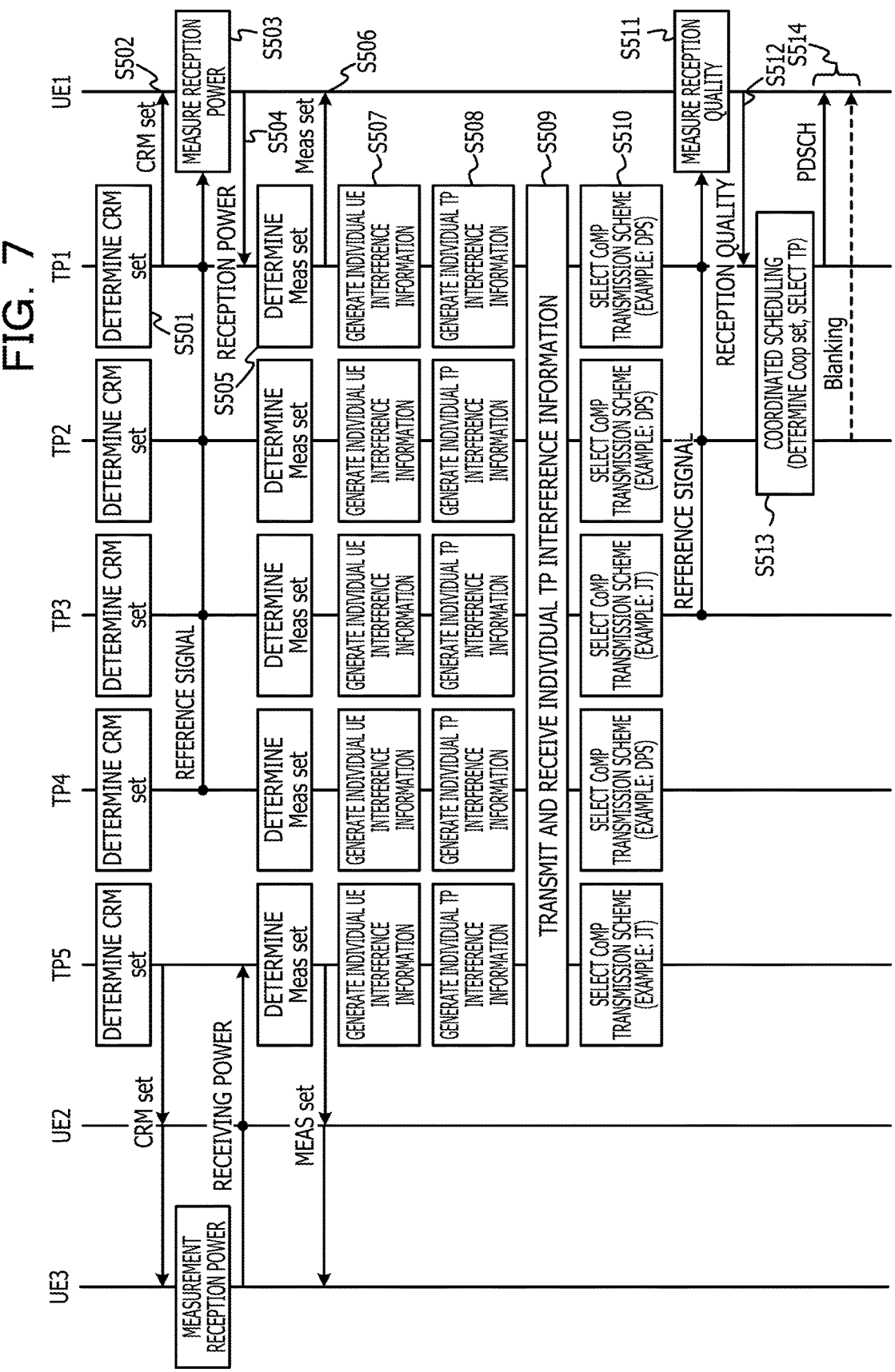
FIG. 7 is a diagram illustrating an example of a sequence of processes of a third embodiment.

Hereinafter, description of a wireless communication system of the third embodiment will be specifically made based on drawings. FIG. 7 is a diagram illustrating an example of a sequence of processes when the wireless communication system of the third embodiment performs coordinated transmission.

Five TPs of the TP1 to a TP5 and three UEs of the UE1 to a UE3 are illustrated in FIG. 7. The UE1 is set to be connected to the TP1, and the UE2 and the UE3 are set to be connected to the TP5.

Although UEs that are connected to the TP2 to the TP4 are not illustrated in FIG. 7 to avoid the illustration being complicated, one or more UEs are assumed to be connected to these TPs unless otherwise specified. The behavior of the TP2 to the TP4 toward the UE connected thereto (the UE governed thereby) may be considered to be the same as that of the TP1 or the TP5 unless otherwise specified.

First, each TP determines a CoMP resource management set (CRM set) regarding the UE governed thereby in S501. The CRM set is a set of TPs (includes a connected TP) that allow a UE to measure reception power so that a TP performs CoMP to the UE. In other words, a UE measures reception power regarding a TP included in the CRM set that is determined for the UE. The CRM set can be interpreted as a set of TPs that pass a first narrowing-down stage for selecting TPs coordinating when a TP performs CoMP transmission to a UE governed thereby. The number of TPs included in the CRM set is defined to be eight (includes a connected TP) at most in LTE-A.

Each TP determines a CRM set for each UE governed thereby. The CRM set that each TP determines may be the same or may be different between the UEs governed thereby. In addition, each TP can determine the CRM set using an arbitrary rule. For example, a TP can include other TPs (may be called neighboring TPs or adjacent TPs) that are arranged comparatively nearby in the CRM set.

In FIG. 7, the TP1, for example, determines a CRM set for the UE1 in S501. Here, the TP1 to the TP4 are assumed to be included in the CRM set that the TP1 determines for the UE1 as an example.

In addition, the TP5 determines a CRM set for each of the UE2 and the UE3 in S501 in FIG. 7. Furthermore, although not illustrated, one or more UEs are connected to the TP2 to the TP4 and are governed thereby as described above. These TPs determine a CRM set for each UE governed thereby in the same manner in which the TP1 determines a CRM set for the UE1.

Each TP transmits information that indicates the CRM set determined in S501 to the corresponding UE in S502 in FIG. 7. Transmission of the CRM set, for example, can be performed through down RRC signaling. Here, each TP included in the CRM set in the information that indicates the CRM set is indicated by, for example, a cell ID. In addition, for each TP (cell ID) included in the CRM set, information related to the frequency (center frequency) that the TP uses can be included in the information that indicates the CRM set.

The TP1, for example, transmits the information that indicates the CRM set to the UE1 in S502 in FIG. 7. In addition, the TP5 transmits the information that indicates the CRM set to each of the UE2 and the UE3 in S501 in FIG. 7. In addition, although not illustrated, one or more UEs are connected to the TP2 to the TP4 and are governed thereby as described above. These TPs transmit the information that indicates the CRM set to each UE governed thereby in the same manner in which the TP1 transmits the information that indicates the CRM set to the UE1.

In S503 in FIG. 7, each UE measures reception power regarding each TP included in the CRM set that is indicated by the information received in S502. Measurement of reception power, for example, can be performed by using a down reference signal (may be called a pilot signal) that is included in a transmission signal from each TP. Several types of a down reference signal exist, but here, a case of using a cell-specific reference signal (CRS) will be described as an example. In the present embodiment, each TP is assumed to form a cell individually, and thus, a TP is assumed to correspond to a cell one-on-one unless otherwise specified.

Measurement of reception power using a reference signal (for example, a CRS) is specifically performed in the following procedure. First, the UE selects one TP included in the CRM set that is indicated by the information received in S502 and observes a DL wireless signal of a frequency that the TP uses. Accordingly, the UE detects a synchronization signal from the DL wireless signal. Then, the UE obtains a cell identification number based on the pattern of the synchronization signal detected. Two signals of a primary-synchronization signal (P-SS) and a secondary-synchronization signal (S-SS) exist as the synchronization signal in an LTE system, and a cell number within a group (three types) and a cell group number (168 types) are obtained respectively from the P-SS and the S-SS. Then, the cell identification number (3×168=504 types) is obtained from the cell number within a group and the cell group number.

Next, the UE receives a reference signal (a CRS and the like) in the DL signal. Here, the CRS is scrambled with a cell identifier, and the cell identifier determines the arrangement of the CRS in a wireless frame. For this reason, a wireless terminal can specify the CRS based on the cell identifier obtained previously. Then, the wireless terminal measures reception power of the reference signal (the CRS and the like). For example, reference signal received power (RSRP) that is a simple value of reception power of the reference signal (the CRS and the like) can be used as reception power. Besides, a reference signal received quality (RSRQ, RSRQ=the value of reception power/a total value of power) and the like can also be used as reception power.

In S503 in FIG. 7, the UE1, for example, respectively measures reception power regarding the TP1 to the TP4 included in the CRM set that is indicated by the information received in S502. In addition, the UE2 or the UE3 measures reception power regarding each TP included in the CRM set in S503. Furthermore, although not illustrated, one or more UEs are connected to the TP2 to the TP4 and are governed thereby as described above. These UEs also measure reception power regarding each TP included in the CRM set in the same manner in which the UE1 measures reception power regarding each TP included in the CRM set.

In S504 in FIG. 7, each UE transmits a report (may be called a reception power report hereinafter) that includes reception power for each TP measured in S503 to the TP. Reception power regarding each TP included in the CRM set that is associated with the identifier (the cell ID and the like) of each TP is included in the reception power report. The reception power report, for example, is transmitted by using up RRC signaling.

The UE1, for example, transmits the reception power report to the TP1 in S504 in FIG. 7. In addition, each of the UE2 and the UE3 transmits a transmission power report to the TP5 in S504. In addition, although not illustrated, one or more UEs are connected to the TP2 to the TP4 and are governed thereby as described above. Each of these UEs transmits the reception power report to the connected TP in the same manner in which the UE1 transmits the reception power report to the TP1.

In S505 in FIG. 7, each TP determines a CoMP measurement set based on the reception power for each TP included in the reception power report received in S504. The CoMP measurement set here is a set of TPs (includes a connected TP) that allow the UE to measure a reception quality so that a TP performs CoMP to the UE. In other words, a UE measures a reception quality regarding a TP included in the CoMP measurement set that is determined for the UE. The CoMP measurement set is a subset of the CRM set. The CoMP measurement set can be interpreted as a set of TPs that pass a second narrowing-down stage for selecting TPs coordinating when a TP performs CoMP to a UE governed thereby. The number of TPs included in the CoMP measurement set is defined to be three (includes a connected TP) at most in LTE-A.

Each TP determines a CoMP measurement set for each UE governed thereby. The CoMP measurement set that each TP determines may be the same or may be different between the UEs governed thereby. Each TP can determine the CoMP measurement set using an arbitrary rule based on the reception power report received in S504. For example, the TP can select at most two TPs in which the difference between the reception power thereof and the reception power of a connected cell is smaller than or equal to a defined value in the reception power report in addition to the connected cell (normally has the greatest reception power in the reception power report) to make the CoMP measurement set. The TP can set the top three TPs in order of greatest reception power in the reception power report to be the CoMP measurement set as another example.

The TP1, for example, determines a CoMP measurement set for the UE1 in S505 in FIG. 7. Here, the TP1 to the TP3 are assumed to be included in the CoMP measurement set that the TP1 determines for the UE1 as an example.

In addition, the TP5 determines a CoMP measurement set for each of the UE2 and the UE3 in S505 in FIG. 7. Furthermore, although not illustrated, one or more UEs are connected to the TP2 to the TP4 and are governed thereby as described above. These TPs determine a CoMP measurement set for each UE governed thereby in the same manner in which the TP1 determines a CoMP measurement set for the UE1.

Next, each TP transmits information that indicates the CoMP measurement set determined in S505 to the corresponding UE in S506. Transmission of the information that indicates the CoMP measurement set, for example, can be performed through down RRC signaling. Here, each TP included in the CoMP measurement set is represented by, for example, a cell ID in the information that indicates the CoMP measurement set. In addition, for each TP (cell ID) included in the CoMP measurement set, information related to the frequency (center frequency) that the TP uses can be included in the information that indicates the CoMP measurement set.

The TP1, for example, transmits the information that indicates the CoMP measurement set to the UE1 in S506 in FIG. 7. In addition, although not illustrated, one or more UEs are connected to each TP and are governed thereby as described above. Each TP transmits the information that indicates the CoMP measurement set to each UE governed thereby in the same manner in which the TP1 transmits the information that indicates the CoMP measurement set to the UE1.

In S507 and S508 in FIG. 7, each TP generates individual TP interference information based on reception power for each TP included in the reception power report received in S504. The individual TP interference information here is information related to interference that the TP receives based on the wireless transmission of other TPs. Each TP can estimate the extent of interference that is given to other TPs because of the wireless transmission thereof by, for example, exchanging the individual TP interference information between TPs. Based on the extent, each TP determines a CoMP transmission scheme.

Each TP can generate the interference information as follows according to the simplest method. First, each TP generates individual UE interference information in S507 and next, generates the individual TP interference information in S508 based on the individual UE interference information. The individual UE interference information here is information related to interference that the UE receives based on wireless transmission of a TP other than the connected TP.

Now, N numbers of UEs are assumed to exist and be governed by a TP. At this time, the TP receives the reception power report from each of the N UEs in S504.

First, in S507, the TP, for example, generates a list (called an individual UE interference list) for each UE governed thereby by extracting other TPs of which the extent of interference may become great in the UE. This, for example, can be realized by extracting, for each N reception power report, other TPs in which the difference between the reception power thereof and the reception power of the connected TP is smaller than or equal to a defined value. The individual UE interference list generated in this manner is information that indicates the extent of interference which the UE receives from TPs other than the connected TP. For this reason, the individual UE interference list, for example, can be used as the above-described "individual UE interference information".

Next, in S508, the TP, for example, counts the number of occurrence (the number of times of being listed up) for each of other TPs in the N pieces of individual UE interference information created for each UE. Then, the TP, for example, selects and lists other TPs of which the number of occurrence in the N pieces of individual UE interference information is greater than or equal to a defined number of times (this is called an individual TP interference list). Other TPs (indicated by the cell ID), for example, can be lined up in the individual TP interference list in order of greatest number of occurrence in the N individual UE interference lists. The individual TP interference list generated in this manner is information that indicates the extent of interference that a UE governed by a TP receives from other TPs. In other words, the individual TP interference list is information related to interference that the TP receives based on the wireless transmission of other TPs. For this reason, the individual TP interference list, for example, can be used as the above-described "interference information".

The TP generates the individual TP interference list based on the reception power report as described above. Here, other TPs (other TPs in the CRM set) included in the reception power report include TPs that may constitute coordinated TPs which perform CoMP transmission with the TP afterward. When CoMP transmission is performed, the TP does not receive interference from coordinated TPs in any of JT and DPS as described above. For this reason, excluding a TP that may become a coordinated TP from the individual TP interference list is considered to be more convenient for using the individual TP interference list as the interference information (information that indicates the extent of interference that a UE governed by a TP receives from other TPs).

Based on the consideration hereinbefore, the procedure of generating the individual TP interference list can be modified as follows. In the procedure described above, other TPs in which the difference between the reception power thereof and the reception power of the connected cell is smaller than or equal to a defined value in each reception power report are extracted when generating the individual UE interference list. In the modified procedure, for example, a TP that is included in the CoMP measurement set (determined in S505) is excluded from other TPs extracted here, and the individual UE interference list is generated. By doing so, a coordinated TP is excluded from the individual UE interference list, and furthermore, a coordinated TP is excluded from the individual TP interference list. The CoMP measurement set is not the same as the set of coordinated TPs because coordinated TPs are selected from the CoMP measurement set. Accordingly, other TPs that may cause interference with high possibility (TPs of which the reception power is great among other TPs that do not become coordinated TPs) can be indicated in the individual TP interference list (the interference information).

Here, another modification example (variation) of the individual TP interference list will be described. In the generation of the individual TP interference list described above, the individual TP interference list is generated by counting the number of occurrence for each of other TPs in the N individual UE interference lists created for each UE. However, the individual TP interference list may be generated by using a simple OR operation in the N individual UE interference lists created for each UE.

In addition, in the modified procedure of generating the individual TP interference list described above, the individual UE interference list is generated by extracting other TPs in which the difference between the reception power thereof and the reception power of the connected cell is smaller than or equal to a defined value in each reception power report and excluding a TP that is included in the CoMP measurement set from other TPs extracted here. However, the individual UE interference list may be generated by excluding only a defined number of TPs in order of greatest reception power among TPs included in the CoMP measurement set instead of excluding all of TPs included in the CoMP measurement set from other TPs extracted.

In S507 in FIG. 7, the TP1, for example, generates the interference information based on reception power for each TP included in the reception power report received from the UE1 in S504. In S506, the TP5 generates the interference information based on reception power for each TP included in the reception power report received from each of the UE2 and the UE3. Furthermore, although not illustrated, one or more UEs are connected to the TP2 to the TP4 and are governed thereby as described above. Each of these TPs generates the interference information in the same manner in which the TP1 generates the interference information.

Next, in S509, each TP transmits and receives the interference information (for example, the individual TP interference list) generated in S507. Each TP transmits the interference information to other TPs and receives the interference information from other TPs. Transmission and reception of the interference information, for example, can be performed through an X2 interface, an optical fiber, and the like.

Transmission and reception of the interference information by each TP are assumed to be realized through mutual exchange of the interference information in the present embodiment. Various forms of transmission and reception of the interference information are considered, but it does not matter which method is used. For example, the interference information may be transmitted and received by multicasting or broadcasting or may be transferred in a TP-to-TP bucket relay manner. In addition, the interference information, for example, may be customized and transmitted depending on the destination of transmission.

The range of transmission and reception (exchange) of the interference information in S509 may comply with an arbitrary rule. For example, each TP may receive the interference information from other TPs included in the interference information that the TP generates (the individual TP interference list). Alternatively, each TP, for example, may receive the interference information from all the TPs that occur once or more times in the CRM set determined for each UE governed thereby.

In S509 in FIG. 7, the TP1 to the TP5, for example, transmits and receives the interference information (for example, the individual TP interference list) generated in S507 to and from each other.

Next, in S510, each TP selects (determines) a CoMP transmission scheme based on the interference information (for example, the individual TP interference list) received from other TPs in S509. This, for example, is performed as follows. Each TP estimates the extent of interference that the TP gives to other TPs based on all the interference information (the individual TP interference list) received in S509. The estimation, for example, can be realized by counting the number of occurrence of the TP (the TP that estimates) in all of the received individual TP interference lists (the number of individual TP interference lists in which the TP is listed up). Then, each TP determines the magnitude of the extent of interference that the TP gives to other TPs. Each TP selects JT as a CoMP transmission scheme when the magnitude is comparatively small and selects DPS as a CoMP transmission scheme when the magnitude is comparatively great. The determination can be realized by determining whether the counted value is greater than or equal to or is smaller than a defined value.

In S510 in FIG. 7, the TP1, for example, selects (determines) a CoMP transmission scheme based on the interference information (for example, the individual TP interference list) received from the TP2 to the TP5 in S509. The TP1 is assumed to select DPS in FIG. 7 as an example. In addition, the TP2 and the TP3 are assumed to respectively select DPS and JT. Although not particularly illustrated because the CoMP measurement set of the UE1 is assumed to be the TP1 to the TP3, it is needless to say that the TP4 and the TP5 can also select a CoMP transmission scheme.

In S511 in FIG. 7, each UE measures a reception quality regarding each TP included in the CoMP measurement set that is indicated by the information received in S506. Measurement of a reception quality, for example, can be performed by using the down reference signal (corresponds to the CRS in the present embodiment as described above) that is included in the transmission signal from each TP.

Each UE receives the CRS from each TP included in the CoMP measurement set as described in S503. Then, each UE obtains a reception quality from each TP included in the CoMP measurement set based on the received CRS. A channel quality indicator (CQI) that is an indicator representing the reception quality of a down signal defined in LTE can be used as a reception quality.

Here, the CQI defined in LTE will be simply described. Based on the signal to interference noise ratio (SINR) of a DL wireless signal measured in the UE, the CQI is calculated in a manner in which a block error rate (BLER) is 10% when a data signal to which a transmission format corresponding to the CQI is applied is received. The CQI can be defined for each system bandwidth or sub-band (a division of a system bandwidth). In LTE, the CQI is four-bit control information and may have 16 types of values. In the present embodiment, the CQI is used for selection (narrowing down) of TPs coordinating in CoMP transmission. Besides, the CQI is used in variations applications such as down scheduling (resource allocation), adaptive modulation and coding (AMC), and the like in the LTE system.

In S511 in FIG. 7, the UE1, for example, measures a reception quality regarding each of the TP1 to the TP3 included in the CoMP measurement set that is indicated by the information received in S506. In addition, although not illustrated, one or more UEs are also connected to other TPs and are governed thereby as described above. Each of these UEs also measures a reception quality regarding each TP included in the CoMP measurement set in the same manner in which the UE1 measures a reception quality regarding each TP included in the CoMP measurement set.

In S512 in FIG. 7, each UE transmits a report (may be called a reception quality report hereinafter) that includes a reception quality (CQI) for each TP measured in S511 to the TP. The CQI of each TP included in the CoMP measurement set that is associated with the identifier (the cell ID and the like) of each TP is included in reception quality report. The reception quality report, for example, is transmitted by using up RRC signaling or a physical uplink control channel (PUCCH).

In S512 in FIG. 7, the UE1, for example, transmits the reception quality report to the TP1. In addition, although not illustrated, one or more UEs are connected to other TPs and are governed thereby as described above. Each of these UEs transmits the reception quality report to the connected TP in the same manner in which the UE1 transmits the reception quality report to the TP1.

Although S506 is written as being necessarily before S507 to S510 in a time-series manner in FIG. 7, it may be noted that the necessity does not have to be fulfilled. Each TP can perform S506 at any time after S505 and before S512. In addition, although S511 and S512 are written as being necessarily after S507 to S510 in a time-series manner, it may be noted that the necessity does not have to be fulfilled. Each TP, for example, can perform S511 and S512 at any time after S506 and before S513 (will be described below). Though, it may be noted that coordinated scheduling that will be described below may not be appropriately performed when a time lag between S511 and S513 is long.

Next, in S513, each TP performs scheduling that is founded on CoMP transmission based on the reception quality report received in S512. Each TP may perform wireless resource allocation regarding the UE governed thereby in normal scheduling in which CoMP is not performed, but scheduling has to be performed in coordination between TPs for performance of CoMP. For this reason, scheduling for performance of CoMP may be called coordinated scheduling.

Each TP performs several determination and processes in order, in a parallel manner, or in a batched manner in coordinated scheduling. For example, each TP determines whether to perform CoMP transmission or not (performs ST in this case). In addition, each TP determines a CoMP cooperation set (corresponds to the entirety or a part of the CoMP measurement set) that is a set of TPs coordinating when performing CoMP. In addition, each TP determines a TP that actually performs transmission among the TPs included in the CoMP cooperation set when the CoMP transmission scheme determined in S510 is DPS. Each TP determines a wireless resource (frequency and time) for transmitting data to the UE regardless of whether to perform CoMP or not. In addition, data for the UE has to be shared in advance among the TPs in the CoMP cooperation set when performing JT or DPS.

The determination or processes related to coordinated scheduling may be performed in an arbitrary procedure or a method. Various procedures or methods are considered regarding coordinated scheduling. Thus, only one example will be simply described here.

The TP, for example, can obtain a reception quality (CQI) in the UE from each TP included in the CoMP measurement set by obtaining the reception quality report from the UE in S512. In addition, the TP, for example, can obtain the status and the like of other TPs (the amount of use of a wireless resource and the like) from other TPs in S513 as occasion calls. The TP estimates a throughput (communication efficiency) in a case where the UE occupies the wireless resource of a plurality of TPs included in the CoMP measurement set and a total throughput in a case where each TP performs non-CoMP transmission (ST) based on these pieces of information. This estimation can be performed for each combination of the TPs included in the CoMP measurement set. According to this estimation, determination of the CoMP cooperation set or whether CoMP is desired or not can be made as a transmission scheme for optimizing a throughput. In addition, a transmission point (TP) in DPS can be determined according to this estimation.

The TP1 is assumed to determine to perform CoMP transmission to the UE1 in coordination with the TP2 in the example in FIG. 7. At this time, the CoMP cooperation set is a set including the TP1 and the TP2. In addition, the TP1 and the TP2 also determine a transmission point since both the TP1 and the TP2 select DPS as the CoMP transmission scheme. The TP1 and the TP2 are assumed to select the TP1 as a transmission point.

Last, in S514, each TP transmits data to the UE based on the result of scheduling in S513. The TP1 and the TP2 coordinate with each other to transmit data to the UE1 through DPS in the example in FIG. 7. At this time, the TP1 transmits data to the UE1 using the wireless resource allocated to the UE1 in S513. Meanwhile, the TP2 performs blanking that means not performing transmission of a wireless signal regarding the same wireless resource. Accordingly, DPS that is coordinated transmission is realized.

According to the description of the third embodiment based on FIG. 7, each TP can select a CoMP transmission scheme based on the extent (magnitude) of interference that is based on the transmission of the TP in S510 through a process that is an extension of an LTE wireless communication system. Accordingly, a proper CoMP transmission scheme may be used for each of a case where JT is relatively advantageous over DPS (when interference is comparatively small) and a case where DPS is relatively advantageous over JT (when interference is comparatively great). Therefore, the effect of embodying CoMP may be sufficiently exhibited according to the third embodiment.

Fourth Embodiment

In the third embodiment, the TP generates the individual UE interference information based on reception power that is reported by the UE (S507 in FIG. 7). Conversely, a fourth embodiment is an embodiment in which the UE generates the individual UE interference information thereof based on reception power and reports the individual UE interference information to the TP.

The fourth embodiment has many common parts with the third embodiment. Therefore, different parts between the fourth embodiment and the third embodiment will be centrally described here.

Figure 8:
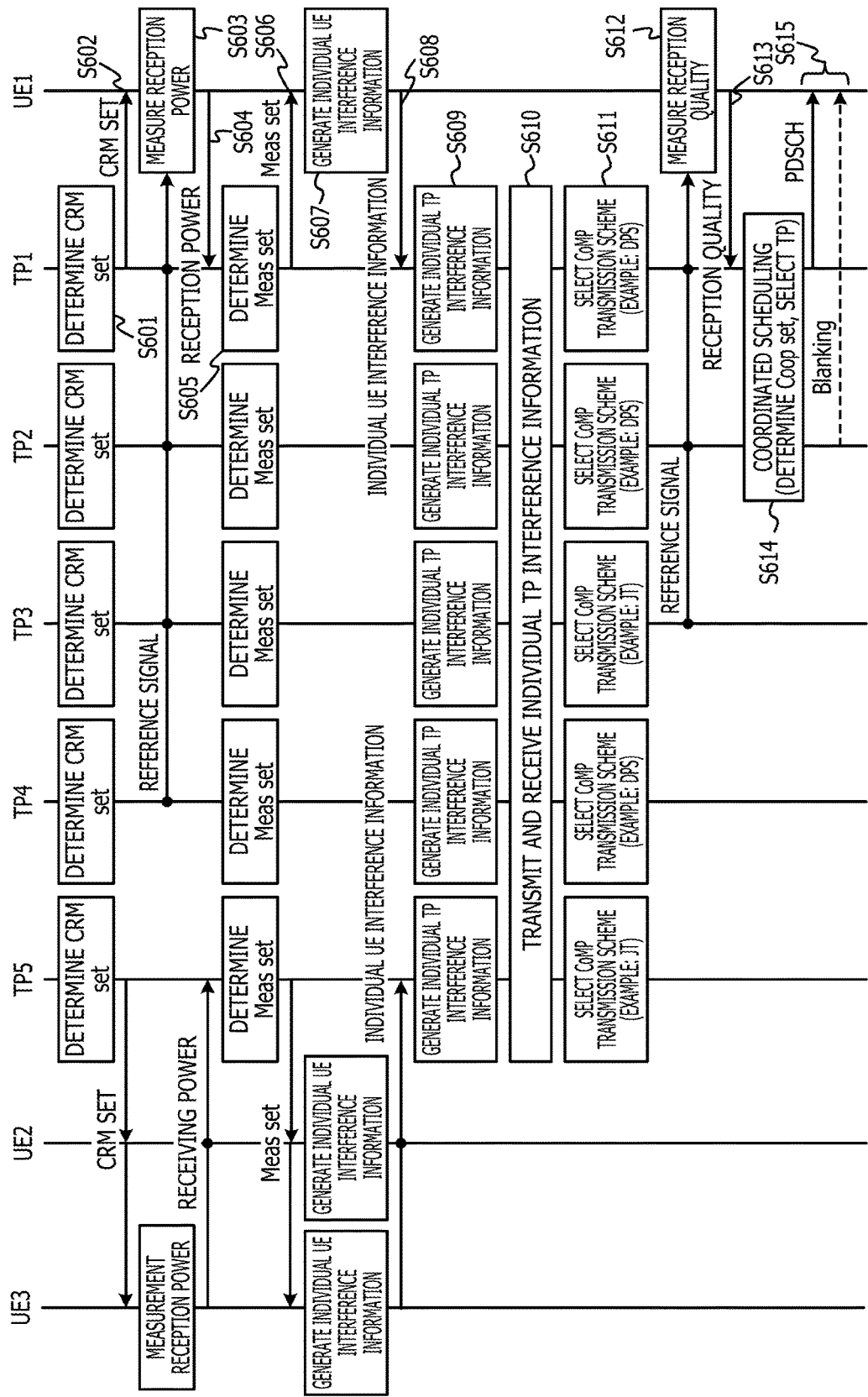
FIG. 8 is a diagram illustrating an example of a sequence of processes of a fourth embodiment.

FIG. 8 is a diagram illustrating an example of a sequence of processes when a wireless communication system of the fourth embodiment performs coordinated transmission. S601 to S606 in FIG. 8 correspond to S501 to S506 in FIG. 7. Thus, description thereof will be omitted here.

In S607 in FIG. 8, each UE generates the individual UE interference information based on the measurement result of reception power in S603. Each UE generates the individual UE interference information based on the measurement result of reception power in the fourth embodiment while each TP generates the individual UE interference information based on the reception power report in the third embodiment. The individual UE interference list, for example, described in the third embodiment can be used as the individual UE interference information. In addition, the UE, for example, can generate the individual UE interference information in the same procedure as that in which the TP generates the individual UE interference information in the third embodiment. Specifically, for example, the list (the individual UE interference list) that is generated by extracting other TPs in which the difference between the reception power thereof and the reception power of the connected TP measured in S603 is smaller than or equal to a defined value can be used as the individual UE interference information. Regarding the defined value that is to be used to generate individual UE configuration information, the UE may receive the value from the TP in advance (for example, using RRC signaling) or may define the value by the UE.

In addition, as in the third embodiment, the individual UE interference list can be generated by excluding a TP included in the CoMP measurement set (received in S606) from other TPs extracted here. By doing so, a coordinated TP is excluded from the individual UE interference list, and furthermore, a coordinated TP is excluded from the individual TP interference list. The CoMP measurement set is not the same as the set of coordinated TPs because coordinated TPs are selected from the CoMP measurement set. Accordingly, other TPs that may cause interference with high possibility (TPs of which the reception power is great among other TPs that do not become coordinated TPs) can be indicated in the individual TP interference list (the interference information).

In S608 in FIG. 8, each UE transmits the individual UE interference information generated in S607 to the connected TP. The individual UE interference information, for example, is transmitted by using up RRC signaling.

In S608 in FIG. 8, the UE1, for example, transmits the individual UE interference information to the TP1. In addition, in S608, each of the UE2 and the UE3 transmits the individual UE interference information to the TP5. In addition, although not illustrated, one or more UEs are connected to the TP2 to the TP4 and are governed thereby as described above. Each of these UEs transmits the individual UE interference information to the connected TP in the same manner in which the UE1 transmits the individual UE interference information to the TP1.

S609 to S615 in FIG. 8 correspond to S508 to S514 in FIG. 7. Thus, description thereof will be omitted here.

According to the fourth embodiment, the same effect as that in the third embodiment is obtained as the description based on FIG. 8. That is, the effect of embodying CoMP may be sufficiently exhibited according to the fourth embodiment.

The number of TPs that report reception power is restricted to the maximum size (=8) of the CRM set as described above. Regarding this, the TP that is a target of the individual UE interference information is not bound by this restriction. Accordingly, a wider range of other TPs than that in the third embodiment may report reception power to the UE according to the fourth embodiment. Therefore, the TP may determine the CoMP transmission scheme considering interference given to a wide range of TPs.

A modification example (variation) related to the individual UE interference information of the fourth embodiment will be described here.

A modification example for suppressing the individual UE interference information to a small amount will be described. In S607, the UE, for example, may generate the individual UE interference information that includes only information on the TP that has the smallest reception power among a plurality of TPs when the TP other than those in the CoMP measurement set in which the difference between the reception power thereof and the reception power of the connected cell is smaller than or equal to a predetermined value is plural. This information is generally considered to represent the furthest TP that gives interference to the UE over a certain extent. The UE transmits the individual UE interference information to the connected TP in S608.

Regarding this, the TP generates the individual TP interference information by aggregating the individual UE interference information (for example, using an OR operation) in S609. This list represents a list of far TPs that give interference to the UE governed by the TP over a certain extent. The individual TP interference information is transmitted and received between TPs in S610.

In S611, the TP determines a CoMP transmission scheme based on the interpretation result of the individual TP interference information received from each TP. For example, when a TP1 is included in the list of a TPn received by the TP1, this can be interpreted as "one of far TPs to which the TP1 gives interference is the TPn". In addition, the TP1 may be included in the list of a TPm that is positioned in a different direction from that of the TPn when viewed from the TP1. This can be interpreted as "another one of far TPs to which the TP1 gives interference is the TPm".

In this example, when, for example, the TP1 is counted in the interference list over or the same as a certain number of times, the TP1 can determine that the number of TPs to which the TP1 gives interference is great, that is, the effect of blanking of the TP1 is great. Alternatively, when the source of transmission of the interference list in which the TP1 is included is separated by a certain extent from the TP1 (each TP is assumed to know the geographical position of each other), the TP1 can determine that the geographical area to which the TP1 gives interference is wide, that is, the effect of blanking of the TP1 is great.

When the effect of blanking of the TP1 is determined to be great as in the first embodiment, DPS can be selected as a CoMP transmission scheme.

According to the modification example hereinbefore, the individual UE interference information can be suppressed to a small amount, and as a result, use of a wireless resource to be used in signaling may be suppressed.

Fifth Embodiment

A fifth embodiment is a modification example of the fourth embodiment and is an embodiment in which the UE generates the individual UE interference information based on reception power and reports the individual UE interference information to the TP.

The fifth embodiment has many common parts with the fourth embodiment. Therefore, different parts between the fourth embodiment and the third embodiment will be centrally described here.

Figure 9:
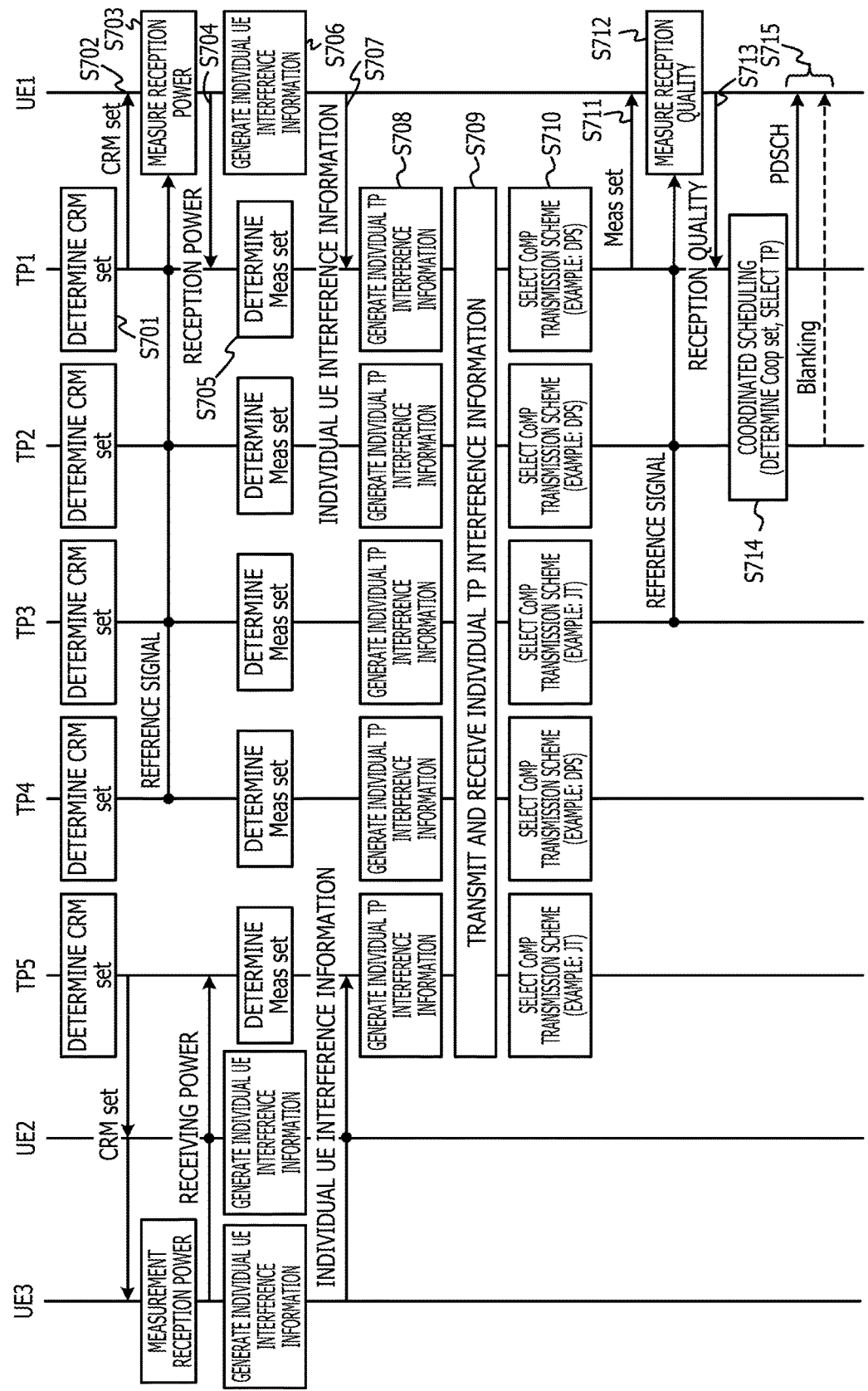
FIG. 9 is a diagram illustrating an example of a sequence of processes of a fifth embodiment.

FIG. 9 is a diagram illustrating an example of a sequence of processes when a wireless communication system of the fifth embodiment performs coordinated transmission. S701 to S705 in FIG. 9 correspond to S601 to S605 in FIG. 8. Thus, description thereof will be omitted here.

In S706 in FIG. 9, the UE generates the individual UE interference information. The process in S706 in FIG. 9 is similar to the process in S607 in FIG. 8 but is partially different as follows.

At the time of S706 in FIG. 9, the UE does not receive the CoMP measurement set. For this reason, excluding a TP included in the CoMP measurement set from the individual UE interference information as described in S607 of the fourth embodiment may not be possible in the fifth embodiment. For this reason, the individual UE interference information generated in the fifth embodiment includes the CoMP measurement set (further includes the CoMP coordination set). S707 in FIG. 9 corresponds to S608 in FIG. 8. Thus, description thereof will be omitted.

In 708 in FIG. 9, the TP generates the individual TP interference information. At this time, the TP can exclude a TP included in the CoMP measurement set (determined in S705) from the individual TP interference information. In addition, the TP, at this time, may not exclude all of TPs included in the CoMP measurement set from the individual TP interference information but exclude a defined number of TPs in order of greatest reception power.

S709 to S715 in FIG. 9 correspond to S610 and S611, S606, and S612 to S615 in FIG. 8. Thus, description thereof will be omitted.

According to the fifth embodiment, the same effect as that in the fourth embodiment is obtained as the description based on FIG. 9. That is, the effect of embodying CoMP may be sufficiently exhibited according to the fifth embodiment.

Other Embodiment

In the third to the fifth embodiment described above, reception power and a reception quality are measured by using the CRS (cell-specific reference signal) which is the reference signal generated based on the cell ID under the assumption that different physical cell IDs (cell ID) are given to each TP. In addition, this cell ID is used as the identifier of the TP in the individual TP interference information and the like. However, a scenario (CoMP deployment scenario 4) in which a plurality of TPs shares a cell ID is known in LTE-A. In such a scenario, consideration is made that reception power and a reception quality from each TP may not be measured by using the CRS, and the cell ID may not be used as the identifier of the TP.

Therefore, to respond to such a scenario described above, description of a modification example of the third to the fifth embodiment will be made based on a channel state information reference signal (CSI-RS) that is a reference signal newly introduced into LTE.

First, a CSI-RS will be described. A CSI-RS is a reference signal that is introduced into LTE Release 10 for quality measurement. The CSI-RS is generated by using a pseudo random sequence. The initial parameter value of the pseudo random sequence is a function of a cell ID (NIDcell) as defined in Expression 1. For this reason, the CSI-RS is designed to be quasi-orthogonal between cells.

$$c_{init} = 2^{10} \cdot (7 \cdot (n_s+1)+l+1) \cdot (2 \cdot N_{ID}^{cell}+1)+2 \cdot N_{ID}^{cell}+N_{CP} \quad \text{[Expression 1]}$$

Since generated based on the cell ID as described above, the CSI-RS is considered to be difficult for use as it is in the above-described scenario in which a plurality of TPs shares the cell ID. Therefore, an extension of the CSI-RS is purposed in LTE Release 11 to recognize a plurality of TPs that shares the cell ID. Specifically, each TP uses a parameter X instead of the cell ID in Expression 1. Here, different values can be used for the parameter X in each TP. Therefore, the aspect of the present application may be realized even in the scenario in which a plurality of TPs shares the cell ID by using such an extension of the CSI-RS instead of the CRS in the third to the fifth embodiment.

Hereinafter, a case where the present modification example is applied to the third embodiment will be specifically described along FIG. 7 that illustrates the flow of the processes of the third embodiment. The present modification example may be applied to the fifth embodiment in the same manner as described previously.

In S501 in FIG. 7, each TP determines the CRM set, and in S502, each TTP transmits the CRM set to each UE. The physical cell ID (cell ID) is used as the identifier of each TP in the CRM set in the third embodiment, but the above-described parameter X can be used as the identifier in the present modification example.

In S503 in FIG. 7, each UE measures reception power of the reference signal from each TP. Reception power is measured based on the CRS included in the DL signal that is transmitted from each TP in the third embodiment, but reception power is measured based on the CSI-RS in the present modification example. The parameter X that corresponds to the TP is used to allow the UE to detect the CSI-RS from each TP. The UE detects the CSI-RS from each TP using the parameter X included in the CRM set and measures reception power based on the CSI-RS.

Even after S504 in FIG. 7, the physical cell ID (cell ID) is used as the identifier of each TP in the third embodiment, but the above-described parameter X can be used as the identifier in the present modification example. In addition, each UE measures a reception quality of the reference signal from each TP in S511. Each UE detects the CSI-RS as in S503 (uses the parameter X in the CoMP measurement set, not the parameter X in the CRM set) and measures a reception quality based on the CSI-RS.

Although the above-described parameter X is used as the identifier of each TP in the description above, an identifier other than this may also be used. For example, an antenna port number can be used as the identifier of each TP. In addition, indexes and the like may be newly defined and used as the identifier of each TP.

According to the present modification example described hereinbefore, the aspect of the present application may be realized even in the scenario in which a plurality of TPs shares the cell ID. Accordingly, the effect of embodying CoMP may be sufficiently exhibited even in the scenario in which a plurality of TPs shares the cell ID.

[Network Configuration of Wireless Communication System in Each Embodiment]

Figure 10:
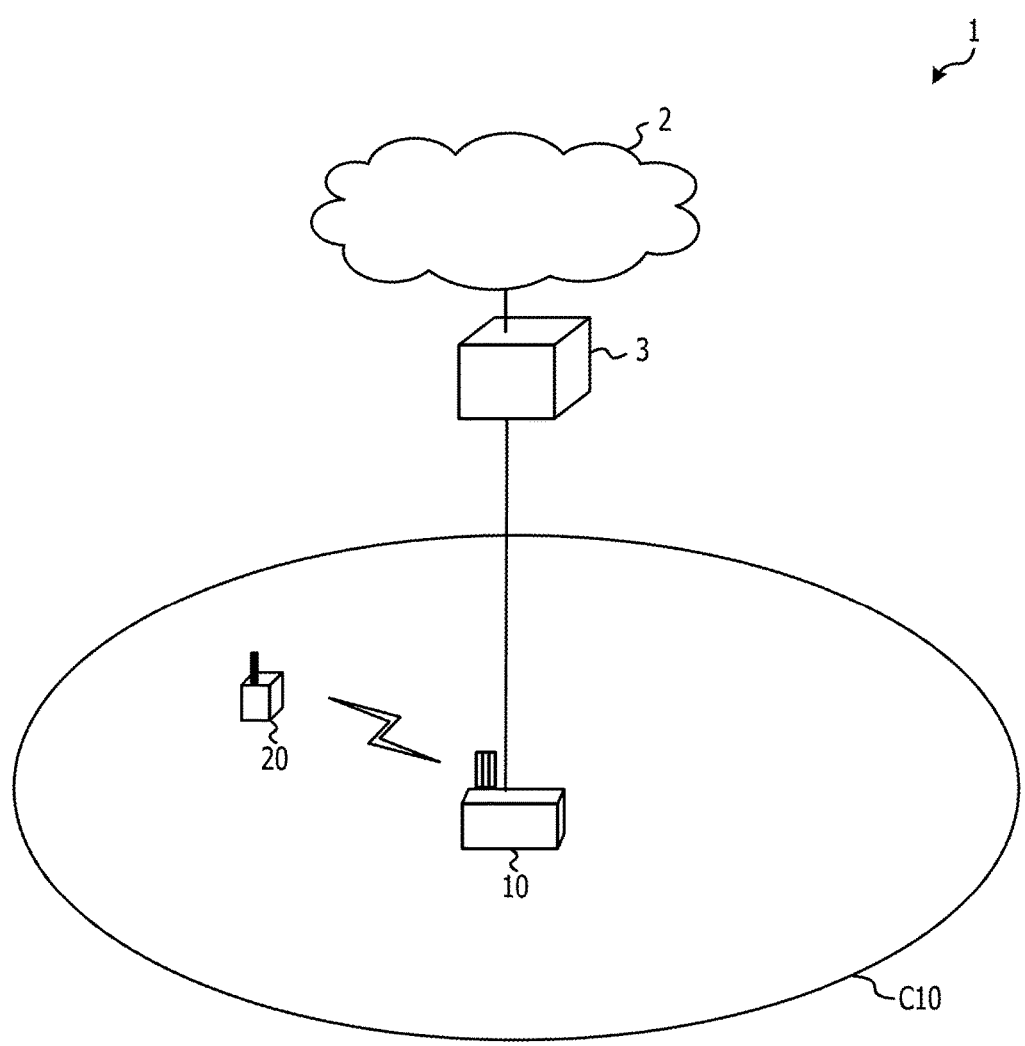
FIG. 10 is a diagram illustrating the configuration of a wireless communication system according to each embodiment.

Next, description of the network configuration of a wireless communication system 1 in the first embodiment will be made based on FIG. 10. The wireless communication system 1 includes a base station 10 and a wireless terminal 20 as illustrated in FIG. 10. The base station 10 forms a cell C10. The wireless terminal 20 exists in the cell C10. It may be noted that the base station 10 may be called the "transmitter station", and the wireless terminal 20 may be called the "receiver station" in the present application.

The base station 10 is connected to a network apparatus 3 through a wired connection, and the network apparatus 3 is connected to a network 2 through a wired connection. The base station 10 is disposed to be capable of transmitting and receiving data or control information to and from other base stations through the network apparatus 3 and the network 2.

The base station 10 may be separated into individual apparatuses by separating a wireless communication function with the wireless terminal 20 and a digital signal process and a control function. In this case, an apparatus provided with the wireless communication function is called a remote radio head (RRH), and an apparatus provided with the digital signal process and the control function is called a base band unit (BBU). The RRH may be installed extending from the BBU, and a wired connection by an optical fiber and the like may be used between the RRH and the BBU. In addition, the base station 10 may be a base station of various sizes besides a small base station (includes a micro base station, a femto base station, and the like) such as a macro base station, a pico base station, and the like. In addition, when a relay station that relays wireless communication between the base station 10 and the wireless terminal 20 is used, the relay station (transmission and reception with the wireless terminal 20 and controlling of transmission and reception) may also be included in the base station 10 of the present application.

Meanwhile, the wireless terminal 20 communicates with the base station 10 through wireless communication.

The wireless terminal 20 may be a terminal such as a cellular phone, a smartphone, a personal digital assistant (PDA), a personal computer, various apparatuses or devices (a sensor device and the like) that have a wireless communication function, and the like. In addition, when a relay station that relays wireless communication between the base station 10 and a terminal is used, the relay station (transmission and reception with the base station 10 and controlling of transmission and reception) may also be included in the wireless terminal 20 of the present document.

The network apparatus 3, for example, includes a communication unit and a control unit, and these constituents are connected unidirectionally or bidirectionally being capable of inputting and outputting a signal or data. The network apparatus 3, for example, is realized by a gateway. For example, the communication unit is realized by an interface circuit, and the control unit is realized by a processor and a memory as the hardware configuration of the network apparatus 3.

Specific forms of distribution or integration of each constituent of the base station and the wireless terminal are not limited to the form of the first embodiment. The entirety or a part of the constituents can be configured by distributing or integrating the constituents functionally or physically in arbitrary units depending on various loads, a status of use, and the like. For example, the memory may be connected via a network or a cable as an external device of the base station and the wireless terminal.

Next, the functional configuration of each apparatus in the wireless communication system of each embodiment will be described based on FIG. 11 and FIG. 12.

Figure 11:
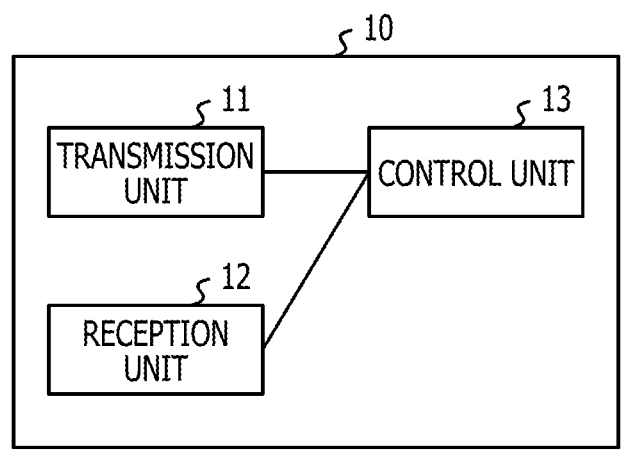
FIG. 11 is a functional block diagram illustrating the configuration of a base station according to each embodiment.

FIG. 11 is a functional block diagram illustrating the configuration of the base station 10. The base station 10 includes a transmission unit 11, a reception unit 12, and a control unit 13 as illustrated in FIG. 11. These constituents are connected unidirectionally or bidirectionally being capable of inputting and outputting a signal or data.

The transmission unit 11 transmits a data signal or a control signal through wireless communication through an antenna. The antenna may be used in common in transmission and reception. The transmission unit 11, for example, transmits a down signal through a down data channel or a control channel. A down physical data channel, for example, includes an individual data channel, physical downlink shared channel (PDSCH). In addition, a down physical control channel, for example, includes an individual control channel, physical downlink control channel (PDCCH). A signal transmitted, for example, includes an L1/L2 control signal that is transmitted to the wireless terminal 20 in the connected state through the individual control channel, a user data signal that is transmitted to the wireless terminal 20 in the connected state through the individual data channel, and a radio resource control (RRC) control signal. In addition, the signal transmitted, for example, includes a reference signal that is used for estimation or demodulation of a channel. Each signal that is transmitted from each TP in FIGS. 4 and 6 to 9 is exemplified as a specific example of the signal that the transmission unit 11 transmits.

The reception unit 12 receives a data signal or a control signal that is transmitted from the wireless terminal 20 through a first wireless communication through an antenna. The reception unit 12, for example, receives an up signal through an up data channel or a control channel. An up physical data channel, for example, includes an individual data channel, physical uplink shared channel (PUSCH). In addition, an up physical control channel, for example, includes an individual control channel, physical uplink control channel (PUCCH). A signal received, for example, includes the L1/L2 control signal that is transmitted from the wireless terminal 20 in the connected state through the individual control channel, the user data signal that is transmitted from the wireless terminal 20 in the connected state through the individual data channel, and the radio resource control (RRC) control signal. In addition, the signal received, for example, includes the reference signal that is used for estimation or demodulation of a channel. Each signal that each TP receives in FIGS. 4 and 6 to 9 is exemplified as a specific example of the signal that the reception unit 12 receives.

The control unit 13 outputs data or control information that is to be transmitted to the transmission unit 11. Data or control information that is received is input to the control unit 13 from the reception unit 12. The control unit 13 obtains data or control information from the network apparatus 3 or other base stations through a wired connection or a wireless connection.

Besides, the control unit performs various controls related to various transmission signals that the transmission unit 11 transmits or various reception signals that the reception unit 12 receives. Controls related to the processes that each TP performs in FIGS. 4 and 6 to 9 are exemplified as a specific example of controls that the control unit 13 performs.

Figure 12:
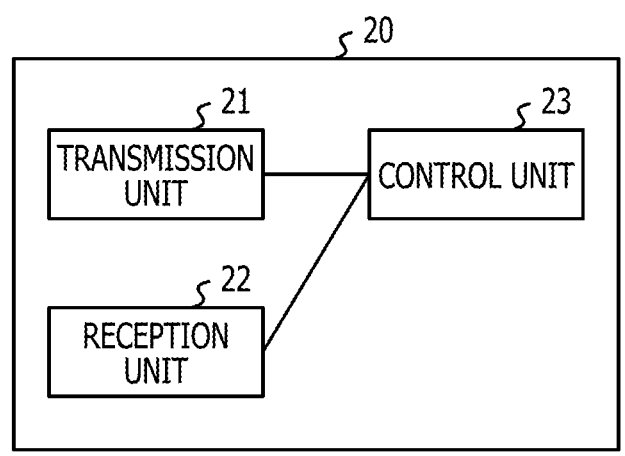
FIG. 12 is a functional block diagram illustrating the configuration of a wireless terminal according to each embodiment.

FIG. 12 is a functional block diagram illustrating the configuration of the wireless terminal 20. The wireless terminal 20 includes a transmission unit 21, a reception unit 22, and a control unit 23 as illustrated in FIG. 12. These constituents are connected unidirectionally or bidirectionally being capable of inputting and outputting a signal or data.

The transmission unit 21 transmits a data signal or a control signal through wireless communication through an antenna. The antenna may be used in common in transmission and reception. The transmission unit 21, for example, transmits an up signal through an up data channel or a control channel. An up physical data channel, for example, includes an individual data channel, physical uplink shared channel (PUSCH). In addition, an up physical control channel, for example, includes an individual control channel, physical uplink control channel (PUCCH). A signal transmitted, for example, includes the L1/L2 control signal that is transmitted to the base station 10 that the wireless terminal 20 connects through the individual control channel, the user data signal that is transmitted to the base station 10 that the wireless terminal 20 connects through the individual data channel, and the radio resource control (RRC) control signal. In addition, the signal transmitted, for example, includes the reference signal that is used for estimation or demodulation of a channel. Each signal that is transmitted from each UE in FIGS. 4 and 6 to 9 is exemplified as a specific example of the signal that the transmission unit 21 transmits.

The reception unit 22 receives the data signal or the control signal that is transmitted from the base station 10 through wireless communication through an antenna. The reception unit 22, for example, receives a down signal through a down data channel or a control channel. A down physical data channel, for example, includes an individual data channel, physical downlink shared channel (PDSCH). In addition, a down physical control channel, for example, includes an individual control channel, physical downlink control channel (PDCCH). A signal received, for example, includes the L1/L2 control signal that is transmitted from the base station 10 that the wireless terminal 20 connects through the individual control channel, the user data signal that is transmitted from the base station 10 that the wireless terminal 20 connects through the individual data channel, and the radio resource control (RRC) control signal. In addition, the signal received, for example, includes the reference signal that is used for estimation or demodulation of a channel. Each signal that each UE receives in FIGS. 4 and 6 to 9 is exemplified as a specific example of the signal that the reception unit 22 receives.

The control unit 23 outputs data or control information that is to be transmitted to the transmission unit 21. Data or control information that is received is input to the control unit 23 from the reception unit 22. The control unit 23 obtains data or control information from the network apparatus 3 or other base stations through a wired connection or a wireless connection.

Besides, the control unit performs various controls related to various transmission signals that the transmission unit 21 transmits or various reception signals that the reception unit 22 receives. Controls related to the processes that each UE performs in FIGS. 4 and 6 to 9 are exemplified as a specific example of controls that the control unit 23 performs.

Last, the hardware configuration of each apparatus in the wireless communication system of each embodiment will be described based on FIG. 13 and FIG. 14.

Figure 13:
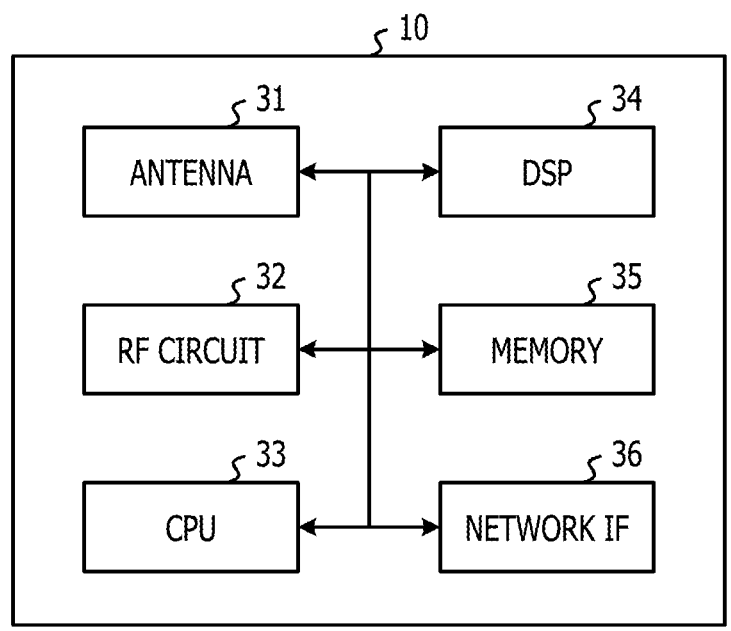
FIG. 13 is a diagram illustrating the configuration of hardware of the base station according to each embodiment.

FIG. 13 is a diagram illustrating the hardware configuration of the base station 10. As illustrated in FIG. 13, the base station 10, for example, includes a radio frequency (RF) circuit 32 that includes an antenna 31, a central processing unit (CPU) 33, a digital signal processor (DSP) 34, a memory 35, and a network interface (IF) 36 as the hardware constituents. The CPU is connected through the network IF 36 such as a switch and the like being capable of inputting and outputting various signals or data. The memory 35, for example, includes at least one of a random access memory (RAM) such as a synchronous dynamic random access memory (SDRAM) and the like, a read-only memory (ROM), and a flash memory and stores a program, control information, or data. The transmission unit 11 and the reception unit 12, for example, are realized by the RF circuit 32 or by the antenna 31 and the RF circuit 32. The control unit 13, for example, is realized by the CPU 33, the DSP 34, the memory 35, an unillustrated digital electronic circuit, and the like. For example, an application specific integrated circuit (ASIC), a field-programming gate array (FPGA), a large scale integration (LSI), and the like are exemplified as the digital electronic circuit.

Figure 14:
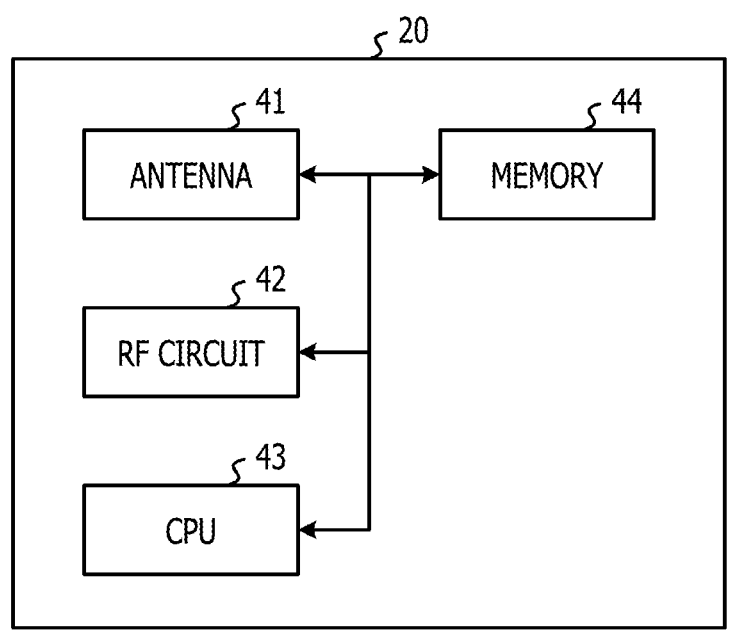
FIG. 14 is a diagram illustrating the configuration of hardware of the wireless terminal according to each embodiment.

FIG. 14 is a diagram illustrating the hardware configuration of the wireless terminal 20. As illustrated in FIG. 14, the wireless terminal 20, for example, includes an RF circuit 42 that includes an antenna 41, a CPU 43, and a memory 44 as the hardware constituents. The wireless terminal 20 may further include a display device such as a liquid crystal display (LCD) and the like that are connected to the CPU 43. The memory 44, for example, includes at least one of a RAM such as a SDRAM, a ROM, and a flash memory and stores a program, control information, or data. The transmission unit 21 and the reception unit 22, for example, are realized by the RF circuit 42 or by the antenna 41 and the RF circuit 42. The control unit 23, for example, is realized by the CPU 43, the memory 44, an unillustrated digital electronic circuit, and the like. For example, an ASIC, a FPGA, an LSI, and the like are exemplified as the digital electronic circuit.

By the way, in this application, for example, "connected to" is able to be replaced with "coupled to". Moreover, for example, when an element is referred to as being "connected to" or "coupled to" another element, it can be not only directly but also indirectly connected or coupled to the other element (namely, intervening elements may be present). So do "connecting to", "coupling to", "connection to", "coupling to" and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method executed by a transmission apparatus included in a plurality of transmission apparatuses, the wireless communication method comprising:
   obtaining a status of transmission from the plurality of transmission apparatuses, each of the plurality of transmission apparatuses storing same data;
   when transmitting the same data to a specified reception apparatus by the plurality of transmission apparatuses, selecting a first transmission scheme or a second transmission scheme based on the status of transmission from the plurality of transmission apparatuses, the first transmission scheme being a transmission scheme in which each of the plurality of transmission apparatuses transmits the same data to the specified reception apparatus using a same radio resource, the second transmission scheme being a transmission scheme in which one transmission apparatus selected from the plurality of transmission apparatuses transmits the same data to the specified reception apparatus using a radio resource, wherein
   the first transmission scheme is joint transmission (JT) of coordinated multiple point (CoMP) transmission and the second transmission scheme is dynamic point selection/blanking (DPS) of CoMP transmission,
   the status of the transmission from the plurality of transmission apparatus is an interference that occurs in accordance with the transmission from the plurality of transmission apparatus, and the first transmission scheme is selected when a degree of the interference is lower than a threshold, the second transmission scheme is selected when the degree of the interference is equal to or higher than the threshold.

2. The wireless communication method according to claim 1 further comprising:
receiving information on the status of the transmission from the plurality of transmission apparatuses.

3. The wireless communication method according to claim 2, wherein
a specified transmission apparatus among the plurality of transmission apparatus receives the information from a different transmission apparatus.

4. The wireless communication method according to claim 3, wherein
the different transmission apparatus receives a report on an interference, from a reception apparatus controlled by the different transmission apparatus.

5. The wireless communication method according to claim 1, wherein
the radio resource includes a time component and a frequency component.

6. The wireless communication method according to claim 1, wherein
when the second transmission scheme is selected, another transmission apparatus of the plurality of transmission apparatuses transmit no data using the radio resource.

7. A wireless communication apparatus in a system including a plurality of transmission apparatuses, the wireless communication apparatus comprising:
a memory; and
a processor configured:
to obtain a status of transmission from the plurality of transmission apparatuses, each of the plurality of transmission apparatuses storing same data, and
when transmitting the same data to a specified reception apparatus by the plurality of transmission apparatuses to a reception apparatus using a radio resource, to select a first transmission scheme or a second transmission scheme based on the status of transmission from the plurality of transmission apparatuses, the first transmission scheme being a transmission scheme in which each of the plurality of transmission apparatuses transmits the same data to the specified reception apparatus using same radio resource, the second transmission scheme being a transmission scheme in which one transmission apparatus selected from the plurality of transmission apparatuses transmits the same data to the specified reception apparatus using a radio resource, wherein the first transmission scheme is joint transmission (JT) of coordinated multiple point (CoMP) transmission and the second transmission scheme is dynamic point selection/blanking (DPS) of CoMP transmission,
the status of the transmission from the plurality of transmission apparatus is an interference that occurs in accordance with the transmission from the plurality of transmission apparatus, and
the first transmission scheme is selected when a degree of the interference is lower than a threshold, the second transmission scheme is selected when the degree of the interference is equal to or higher than the threshold.

8. The wireless communication apparatus according to claim 7, wherein
the processor is configured to receive information on the status of the transmission from the plurality of transmission apparatuses.

9. The wireless communication apparatus according to claim 7, wherein
the status of the transmission from the plurality of transmission apparatus includes an interference that occurs in accordance with the transmission from the plurality of transmission apparatus.

10. The wireless communication apparatus according to claim 8, wherein
the wireless communication apparatus is included in the plurality of transmission apparatus and receives the information from a different transmission apparatus.

11. The wireless communication apparatus according to claim 9, wherein
the first transmission scheme is selected when a degree of the interference is lower than a threshold, the second transmission scheme is selected when the degree of the interference is equal to or higher than the threshold.

12. The wireless communication apparatus according to claim 10, wherein
the different transmission apparatus receives a report on the interference, from a reception apparatus controlled by the different transmission apparatus.

13. The wireless communication method according to claim 7, wherein
the radio resource includes a time component and a frequency component.

14. The wireless communication method according to claim 7, wherein
when the second transmission scheme is selected, another transmission apparatus of the plurality of transmission apparatuses transmit no data using the radio resource.

* * * * *